United States Patent
Laine et al.

(10) Patent No.: US 10,853,422 B2
(45) Date of Patent: Dec. 1, 2020

(54) PRIVATE INFORMATION RETRIEVAL WITH PROBABILISTIC BATCH CODES

(71) Applicant: Microsoft Technology Licensing, LLC, Redmond, WA (US)

(72) Inventors: Kim Laine, Redmond, WA (US); Hao Chen, Redmond, WA (US); Srinath T V Setty, Redmond, WA (US); Sebastian Angel, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 15/957,386

(22) Filed: Apr. 19, 2018

(65) Prior Publication Data

US 2019/0325082 A1 Oct. 24, 2019

(51) Int. Cl.
*G06F 16/903* (2019.01)
*G06F 16/901* (2019.01)

(52) U.S. Cl.
CPC ...... *G06F 16/90335* (2019.01); *G06F 16/901* (2019.01)

(58) Field of Classification Search
None
See application file for complete search history.

(56) References Cited

U.S. PATENT DOCUMENTS

| | | | |
|---|---|---|---|
| 8,898,120 B1 | 11/2014 | Efstathopoulos | |
| 9,020,953 B1 | 4/2015 | Zilmer et al. | |
| 9,031,229 B1 * | 5/2015 | Nita | H04L 9/0894 380/28 |
| 9,471,500 B2 | 10/2016 | Kruus et al. | |
| 2005/0147246 A1 * | 7/2005 | Agrawal | H04L 9/0662 380/44 |
| 2006/0085651 A1 * | 4/2006 | Staddon | G06F 21/6227 713/193 |
| 2008/0228691 A1 | 9/2008 | Shavit et al. | |
| 2014/0007250 A1 | 1/2014 | Stefanov et al. | |
| 2014/0310476 A1 * | 10/2014 | Kruus | G06F 12/0871 711/133 |
| 2017/0068671 A1 * | 3/2017 | Ramanathan | G06F 16/2255 |

(Continued)

OTHER PUBLICATIONS

Xun Yi et al, "Single-Database Private Information Retrieval from Fully Homomorphic Encryption", IEEE Transactions on Knowledge and Data Engineering, vol. 25, No. 5, May 2013, pp. 1125-1134.*

(Continued)

*Primary Examiner* — Uyen T Le
(74) *Attorney, Agent, or Firm* — Schwegman Lundberg & Woessner, P.A.

(57) ABSTRACT

Systems, methods, and computer-executable instructions for reducing amortized computational costs for a query that includes receiving at least two indexes for elements stored in an n-element database. The n-element database is encoded into at least three buckets. Each element is stored within at least two buckets. Each bucket stores a proper subset of the n-elements. For each of the two indexes, a bucket is determined to retrieve the element at the index. The determined buckets are queried to retrieve the elements. The elements at the indexes are retrieved based on the querying the determined buckets.

20 Claims, 11 Drawing Sheets

(56) References Cited

U.S. PATENT DOCUMENTS

2017/0323118 A1    11/2017   Fink et al.

OTHER PUBLICATIONS

"Pung: Unobservable communication over fully untrusted infrastructure", Retrieved From <<https://github.com/pung-project/pung>>, Sep. 2017, 5 Pages.
"Simple encrypted arithmetic library—SEAL", In Journal of IACR Cryptology ePrint Archive, Nov. 13, 2017, 5 Pages.
Amat, Nicolas, "XPIR: NFLLWE Security Estimator", Retrieved From <<https://github.com/XPIR-team/XPIR/blob/master/crypto/NFLLWESecurityEstimator/NFLLWESecurityEstimator-README>>, Jun. 2017, 2 Pages.
Adebayo, Julius, "Probabilistic Data Structure Showdown: Cuckoo Filters vs. Bloom Filters", In Whitepaper of Fast Forward Labs, Nov. 23, 2016, 9 Pages.
Aguilar-Melchor, et al., "XPIR: Private information retrieval for everyone", In Proceedings on Privacy Enhancing Technologies Symposium, Jul. 19, 2016, pp. 1-20.
Aguilar-Melchor, et al., "XPIR: Private information retrieval for everyone", Retrieved From <<https://github.com/xpir-team/xpir/>>, Apr. 2016, 12 Pages.
Albrecht, et al., "On the concrete hardness of learning with errors", In Journal of Mathematical Cryptology, vol. 9, Issue 3, Oct. 2015, pp. 1-40.
Angel, et al., "Unobservable communication over fully untrusted infrastructure", In Proceedings of 12th USENIX Symposium on Operating Systems Design and Implementation, Nov. 2, 2016, pp. 551-569.
Arbitman, et al., "Backyard cuckoo hashing: Constant worst-case operations with a succinct representation", In Proceedings of 51th Annual IEEE Symposium on Foundations of Computer Science, Oct. 23, 2010, 35 Pages.
Azar, et al., "Balanced allocations", In Proceedings of Twenty-Sixth Annual ACM Symposium on Theory of Computing, May 23, 1994, pp. 1-10.
Barak, et al., "On the (im)possibility of obfuscating programs", In Journal of the ACM, vol. 59, Issue 2, Apr. 2012, 48 Pages.
Beimel, et al., "Breaking the $O(n1/(2k-1))$ barrier for information-theoretic private information retrieval", In Proceedings of 43rd Symposium on Foundations of Computer Science, Nov. 16, 2002,10 Pages.
Beimel, et al., "Reducing the servers computation in private information retrieval: PIR with preprocessing", In Proceedings of 20th Annual International Cryptology Conference Advances in Cryptology, Aug. 20, 2000, pp. 1-24.
Bloom, Burton H., "Space/time trade-offs in hash coding with allowable errors", In Communications of ACM, vol. 13, Issue 7, Jul. 1, 1970, pp. 422-426.
Borisov, et al., "DP5: A private presence service", In Proceedings of Privacy Enhancing Technologies Symposium, Jun. 2015, pp. 4-24.
Boyle, et al., "Can we access a database both locally and privately?", In Journal of IACR Cryptology ePrint Archive, Sep. 2017, 29 Pages.
Brakerski, et al., "(leveled) Fully Homomorphic Encryption without Bootstrapping", In Proceedings of Innovations in Theoretical Computer Science Conference, Jan. 8, 2012, pp. 1-35.
Brakerski, et al., "Fully homomorphic encryption from Ring-LWE and security for key dependent messages", In Proceedings of 31st Annual Cryptology Conference Advances in Cryptology, Aug. 14, 2011, 20 Pages.
Breslow, et al., "Horton tables: Fast hash tables for in-memory data-intensive computing", in Proceedings of Usenix Annual Technical Conference, Jun. 23, 2016, pp. 1-237. ri.
Cachin, et al., "Computationally private information retrieval with polylogarithmic communication", in Proceedings of International Conference on the Theory and Applications of Cryptographic Techniques, May 02, 1999, pp. 1-13. E.
Cain, et al., "The random graph threshold for k-orientability and a fast algorithm for optimal multiple-choice allocation", in Proceedings of Eighteenth Annual Acm-Siam Symposium on Discrete Algorithms, Jan. 07, 2007, pp. 469-476. Li.
Canetti, et al., "Towards Doubly Efficient Private Information Retrieval", in Journal of Iacr Cryptology ePrint Archive, Sep. 25, 2017, pp. 1-24. ri.
Chang, Yan-Cheng, "Single database private information retrieval with logarithmic communication", in Proceedings of 9th Australasian Conference on Information Security and Privacy, Jul. 13, 2004, pp. 1-13. n.
Chen, et al., "Fast private set intersection from homomorphic encryption", in Proceedings of Acm Conference on Computer and Communications Security, Oct. 30, 2017, 20 pp.
Chen, et al., "Optimal response time retrieval of replicated data", in Proceedings of the Acm Symposium on Principles of Database Systems, May 24, 1994, pp. 36-44.
Chen, et al., "Simple encrypted arithmetic library - Seal v2.2", in Technical Report of Msr-Tr-2017-22, Jun. 04, 2017, 16 pp.. 1-1.
Cheng, et al., "Talek: a Private Publish-Subscribe Protocol", in Technical Report of University of Washington Computer Science and Engineering Uw-Cse-16-11-01, Nov. 2016, 17 pp.. ri.
Chor, et al., "Private Information Retrieval", in Proceedings of 36th Annual Symposium on Foundations of Computer Science, Oct. 23, 1995, pp. 41-50. E.
Chor, et al., "Private information retrieval by keywords", in Journal of Iacr Cryptology ePrint Archive, Feb. 1998, 19 pp.. Li.
Coppersmith, et al., "Matrix multiplication via arithmetic progressions", In Proceedings of 19th Annual ACM Symposium on Theory of Computing, May 1987, pp. 1-6.
Czumaj, et al., "Randomized allocation processes", In Proceedings of 38th IEEE Symposium on Foundations of Computer Science, Oct. 19, 1997, pp. 1-10.
Demmler, et al., "RAID-PIR: Practical multi-server PIR", In Proceedings of 6th ACM Cloud Computing Security Workshop, Nov. 7, 2014, pp. 45-56.
Devet, et al., "Optimally robust private information retrieval", In Proceedings of 21st USENIX Conference on Security Symposium, Aug. 8, 2012, 15 Pages.
Dietzfelbinger, et al., "Tight thresholds for Cuckoo hashing via XORSAT", In Proceedings of 37th International Colloquium on Automata, Languages and Programming, Jul. 6, 2010, pp. 1-36.
Dietzfelbinger, et al., "A new universal class of hash functions and dynamic hashing in real time", In Proceedings of International Colloquium on Automata, Languages and Programming, Jul. 16, 1990, pp. 6-19.
Dong, et al., "A fast single server private information retrieval protocol with low communication cost", In Proceedings of 19th European Symposium on Research in Computer Security, Sep. 7, 2014, 18 Pages.
Fan, et al., "Somewhat practical fully homomorphic encryption", In Journal of IACR Cryptology ePrint Archive, Mar. 2012, pp. 1-19.
Fernholz, et al., "The k-orientability thresholds for Gn,p", In Proceedings of ACM-SIAM Symposium on Discrete Algorithms, Jan. 7, 2007, pp. 459-468.
Gall, Francois LE, "Powers of tensors and fast matrix multiplication", In Proceedings of 39th International Symposium on Symbolic and Algebraic Computation, Jul. 23, 2014, pp. 1-28.
Garg, et al., "Secure obfuscation in a weak multilinear map model", In Proceedings of 14th International Conference on Theory of Cryptography Conference, Oct. 31, 2016, pp. 1-28.
Gentry, et al., "Fully homomorphic encryption with polylog overhead", In Proceedings of International Conference on the Theory and Applications of Cryptographic Techniques, Apr. 15, 2012, pp. 456-482.
Gentry, et al., "Single-database private information retrieval with constant communication rate", In Proceedings of 32nd International Colloquium on Automata, Languages and Programming, Jul. 11, 2005, pp. 803-815.
Goldberg, Ian, "Improving the robustness of private information retrieval", In Proceedings of IEEE Symposium on Security and Privacy, May 20, 2007, 15 Pages.

(56) References Cited

OTHER PUBLICATIONS

Green, et al., "A protocol for privately reporting ad impressions at scale", In Proceedings of ACM Conference on Computer and Communications Security, Oct. 24, 2016, 11 Pages.

Groth, et al., "Multi-query computationally-private information retrieval with constant communication rate", In Proceedings of International Conference on Practice and Theory in Public Key Cryptography, May 26, 2010, pp. 107-123.

Gupta, et al., "Scalable and private media consumption with Popcorn", In Proceedings of 13th USENIX Symposium on Networked Systems Design and Implementation, Mar. 16, 2016, pp. 91-108.

Henry, et al., "One (block) size fits all: PIR and SPIR with variable-length records via multi-block queries", In Proceedings of Network and Distributed System Security Symposium, Feb. 2013, 18 Pages.

Henry, Ryan, "Polynomial batch codes for efficient IT-PIR", In Proceedings of Privacy Enhancing Technologies, Jul. 14, 2016, pp. 202-218.

Ishai, et al., "Batch codes and their applications", In Proceedings of ACM Symposium on Theory of Computing, Jun. 13, 2004, pp. 262-271.

Ishai, et al., "Zero-knowledge from secure multiparty computation", In Proceedings of ACM Symposium on Theory of Computing, Jun. 11, 2007, pp. 21-30.

Karger, et al., "Consistent hashing and random trees: distributed caching protocols for relieving hot spots on the world wide web", In Proceedings of ACM Symposium on Theory of Computing, May 4, 1997, 10 Pages.

Key, et al., "Path selection and multipath congestion control", In Proceedings of IEEE International Conference on Computer Communications, May 6, 2007, 9 Pages.

Yi, et al., "Single-Database Private Information Retrieval from Fully Homomorphic Encryption", In Journal of IEEE Transactions on Knowledge and Data Engineering, vol. 25, Issue 5, May 2013, pp. 1125-1134.

Khosla, Megha, "Balls into bins made faster", In Proceedings of European Symposium on Algorithms, Sep. 2, 2013, pp. 1-16.

Kiayias, et al., "Optimal rate private information retrieval from homomorphic encryption", In Proceedings of Privacy Enhancing Technologies Symposium, Jun. 30, 2015, pp. 222-243.

Kushilevitz, et al., "Replication is not needed: Single database, computationally-private information retrieval", In Proceedings of 38th Annual Symposium on Foundations of Computer Science, Oct. 20, 1997, 10 Pages.

Kwon, et al., "Riffle: An efficient communication system with strong anonymity", In Proceedings of Privacy Enhancing Technologies Symposium, Jul. 2016, pp. 115-134.

Lipmaa, et al., "A simpler rate-optimal CPIR protocol", In Journal of IACR Cryptology ePrint Archive, Apr. 2017, pp. 1-17.

Lipmaa, Helger, "First CPIR protocol with data-dependent computation", In Proceedings of 12th International Conference on Information, Security and Cryptology, Dec. 2, 2009, pp. 1-18.

Lipmaa, et al., "Linear batch codes", In Proceedings of 4th International Castle Meeting on Coding Theory and Applications, Sep. 15, 2014, 5 Pages.

Lueks, et al., "Sublinear scaling for multi-client private information retrieval", In Proceedings of International Financial Cryptography and Data Security Conference, Jan. 26, 2015, 18 Pages.

Mittal, et al., "PIR-Tor: Scalable anonymous communication using private information retrieval", In Proceedings of USENIX Security Symposium, Aug. 8, 2011, 16 Pages.

Mitzenmacher, Michael David, "The power of two choices in randomized load balancing", In Journal of IEEE Transactions on Parallel and Distributed Systems, vol. 12, Issue 10, Oct. 2001, 127 Pages.

Ousterhout, et al., "Sparrow: Distributed, low latency scheduling", In Proceedings of ACM Symposium on Operating Systems Principles, Nov. 3, 2013, pp. 69-84.

Pagh, et al., "Cuckoo hashing", In Proceedings of 9th European Symposium on Algorithms, Aug. 28, 2001, 24 Pages.

Paterson, et al., "Combinatorial batch codes", In Journal of Advances in Mathematics of Communications, vol. 3, Issue 1, Feb. 2009, pp. 1-14.

Pinkas, et al., "Scalable private set intersection based on OT extension", In Cryptology ePrint Archive: Report 2016/930, Sep. 26, 2016, pp. 1-35.

Dimakis, et al., "Batch codes through dense graphs without short cycles", In Journal of IEEE Transactions on Information Theory, vol. 62, Issue 4, Apr. 2016, 23 Pages.

Rawat, et al., "Locality and availability in distributed storage", In Journal of the IEEE International Symposium on Information Theory, Jun. 29, 2014, 9 Pages.

Silberstein, Natalia, "Fractional repetition and erasure batch codes", In Proceedings of 4th International Castle Meeting on Coding Theory and Applications, Sep. 15, 2014, pp. 1-8.

Silberstein, et al., "Optimal fractional repetittion codes and fractional repetition batch codes", In Proceedings of IEEE International Symposium on Information Theory, Jun. 14, 2015, 5 Pages.

Sousa, et al., "Efficient and secure outsourcing of genomic data storage", In Journal of BMC Medical Genomics, vol. 10 (Suppl 2), Jul. 26, 2017, 14 Pages.

Stern, Julien P., "A new and efficient all-or-nothing disclosure of secrets protocol", In Proceedings of International Conference on Theory and Application of Cryptology and Information Security, Oct. 18, 1998, pp. 357-371.

Talwar, et al., "Balanced allocations: the weighted case", In Proceedings of Thirty-Nine ACM Symposium on Theory of Computing, Jun. 11, 2007, pp. 1-19.

Vöcking, Berthold, "How asymmetry helps load balancing", In Journal of the ACM, vol. 50, Issue 4, Jul. 1, 2003, pp. 568-589.

Strassen, Volker, "Gaussian elimination is not optimal", In Journal of Numerische Mathematik, vol. 13, Issue 4, Aug. 29, 1969, pp. 354-356.

Wang, et al., "Codes for network switches", In Proceedings of IEEE International Symposium on Information Theory, Jul. 7, 2013, 8 Pages.

Wang, et al., "Optimal binary switch codes with small query size", In Proceedings of IEEE International Symposium on Information Theory, Jun. 14, 2015, 5 Pages.

Williams, et al., "Access Privacy and Correctness on Untrusted Storage", In Journal of ACM Transactions on Information and System Security, vol. 16, Issue 3, Nov. 2013, 29 Pages.

\* cited by examiner

PRIVATE INFORMATION RETRIEVAL WITH PROBABILISTIC BATCH CODES

BACKGROUND

A key cryptographic building block in some privacy-preserving systems is private information retrieval (PIR). Some examples of PIR include anonymous and unobservable communication, privacy-preserving media streaming, ad delivery, friend discovery, and subscriptions.

PIR allows a client to download an element (e.g., movie, web page, friend record) from a database held by an untrusted server (e.g., streaming service, social network) without revealing to the server which element was downloaded. PIR is very powerful, but also very expensive. Unfortunately, this expense is fundamental: PIR schemes force the database server to perform some computation on every element in the database to answer a single client query. This is because if the server were to omit an element when answering a query, the server would learn that the omitted element is of no interest to the client.

There is an information theoretic PIR (IT-IR) scheme that replicates a database across several non-colluding servers. The client may issue a carefully-crafted query to each server. The client then combines the responses from all the servers locally. IT-PIR schemes have two benefits. First, the servers' computation is relatively inexpensive (e.g., an XOR for each entry in the database). Second, the privacy guarantees are information-theoretic, meaning they hold against a computationally-unbounded adversary and avoid cryptographic hardness assumptions. However, basing systems on IT-PIR poses significant deployment challenges since it is difficult to enforce the non-collusion assumption in practice.

There is a computation variant of PIR (CPIR). CPIR relies only on cryptographic hardness assumption. CPIR may be used with a database controlled by a single administrative domain under cryptographic hardness assumptions. CPIR systems are more expensive than IT-PIR protocols as they require the database operator to perform costly cryptographic operations on each database element. Previous work has been done to improve the resource overheads of CPIR. Unfortunately, the costs of even the most recent CPIR constructions are so significant that currently known CPIR-backed systems must settle with supporting small databases with fewer than 100,000 entries.

Regardless of which flavor of PIR a system implements, the costs remain undeniably high. As a result, systems are unable to support large databases or handle many requests. Thus, making PIR systems, such as CPIR, less expensive would allow PIR systems to be more widely deployed, support larger databases, and support more requests.

DETAILED DESCRIPTION

Figure 1:
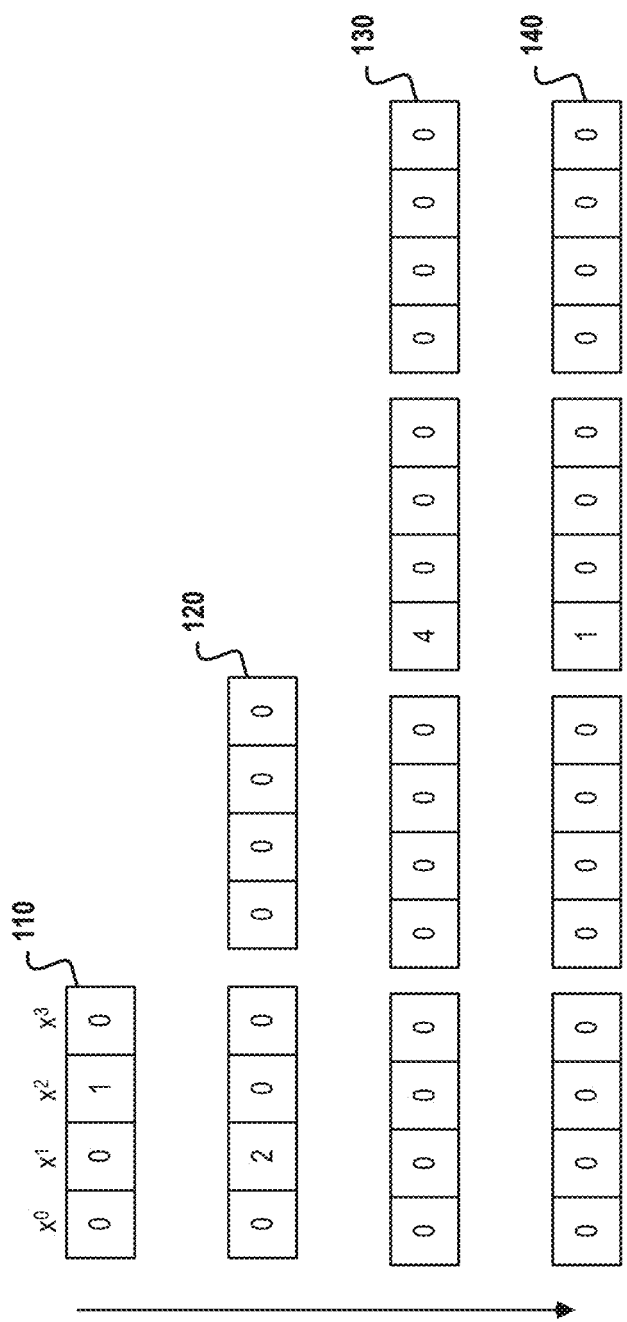
FIG. 1 is an example of expanding an initial plaintext query in accordance with respective examples.

Private information retrieval (PIR) is a key building block in many privacy-preserving systems. Described herein are two complementary techniques that make the computational variant of PIR (CPIR) more efficient in terms of computational overhead, throughput, and network costs. Processing and memory costs of current CPIR systems require small databases, e.g., 100,00 entries or less. Small databases allow CPIR systems to return results from a query in a timely manner while being a privacy-preserving system. Current CPIR systems, however, are not able to support larger databases due to the processing and memory requirements of current PIR implementations. Various embodiments described herein reduce the query size, increase network throughput, reduce client resource usage, decrease network costs, etc., which enables support for larger databases and faster access of small databases. In this manner, the described techniques achieve a variety of technical advantages including, but not limited to, increasing computing system speed, conserving memory, reducing processor load, reducing network load, and increasing throughput.

In various examples, query compression is used to reduce network costs. In the known CPIR protocol XPIR, a query consists of a vector of n ciphertexts, where n is the number of elements in the server's database. Known techniques allow the vector to be reduced to $d^2\sqrt{n}$. This reduction makes network costs sublinear to the size of the database, but at the cost of an exponential increase in the size of the response. When d is greater than 3 in XPIR, the responses are large enough to outweigh the reduction in query size.

In various examples, a fundamentally different approach is used to reduce the query size without changing the size of the results. In an example, a client sends a single ciphertext containing an encoding of the index of the desired element. The server then executes a new oblivious expansion procedure that extracts the corresponding n-ciphertext vector from the single ciphertext, without leaking any information about the client's index, and without increasing the size of the response. The server may then proceed with the XPIR protocol on the extracted vector as before.

In terms of concrete savings over XPIR, the above query reduction results in queries that are 256× smaller and are 28× less expensive for the client to construct. However, the query reduction does introduce between 8% and 31% CPU overhead to the server over XPIR to expand the queries. As XPIR's protocol is parallel, additional servers may be employed to regain the lost throughput.

In another example, probabilistic batch code (PBCs) are used to reduce network costs and increase throughput. PBCs are used to build a multi-query PIR scheme that allows the server to amortize the computational cost of processing multiple queries from the same client. In experiments, PBCs achieved a 6.7× speedup over processing queries one at a time. In an experiment, the probabilistic batching coding was applied to the Pung unobservable communication system which relies on a custom multi-query CPIR protocol for its privacy guarantees. Replacing Pung's protocol with PBCs reduced network costs by 33× and increased throughput by 2×.

PBCs are a relaxation of batch codes. Most known batch code constructions target a different domain. Using batch codes introduce significant network costs, which makes performance at best equally to known PIR systems. PBCs address the network cost issue at the expense of introducing a small probability of failure. In the context of multi-query PIR, failure simply means that a client only gets some (not all) of the queries answered in a single interaction. While the implications of failure depend on the application, failure in many cases is not an issue in practice. Furthermore, the failure probability of PBCs is very low, about one in a trillion multi-queries would fail.

PBC construction uses a hashing in the head technique that is described in greater detailed below. Hashing in the head flips the way that hashing is typically used in distributed systems to achieve load balancing: instead of executing the hashing algorithm during data placement, the hashing algorithm is executed during data retrieval. Like batch codes, PBCs construction amortize CPU costs when processing a batch of queries. Unlike batch codes, PBCs are more network-efficient: PBCs introduce orders of magnitude less network overheads than existing batch codes. Furthermore, PBCs are general and may be used to amortize computation on any PIR scheme, including the information-theoretic variants.

Figure 5:
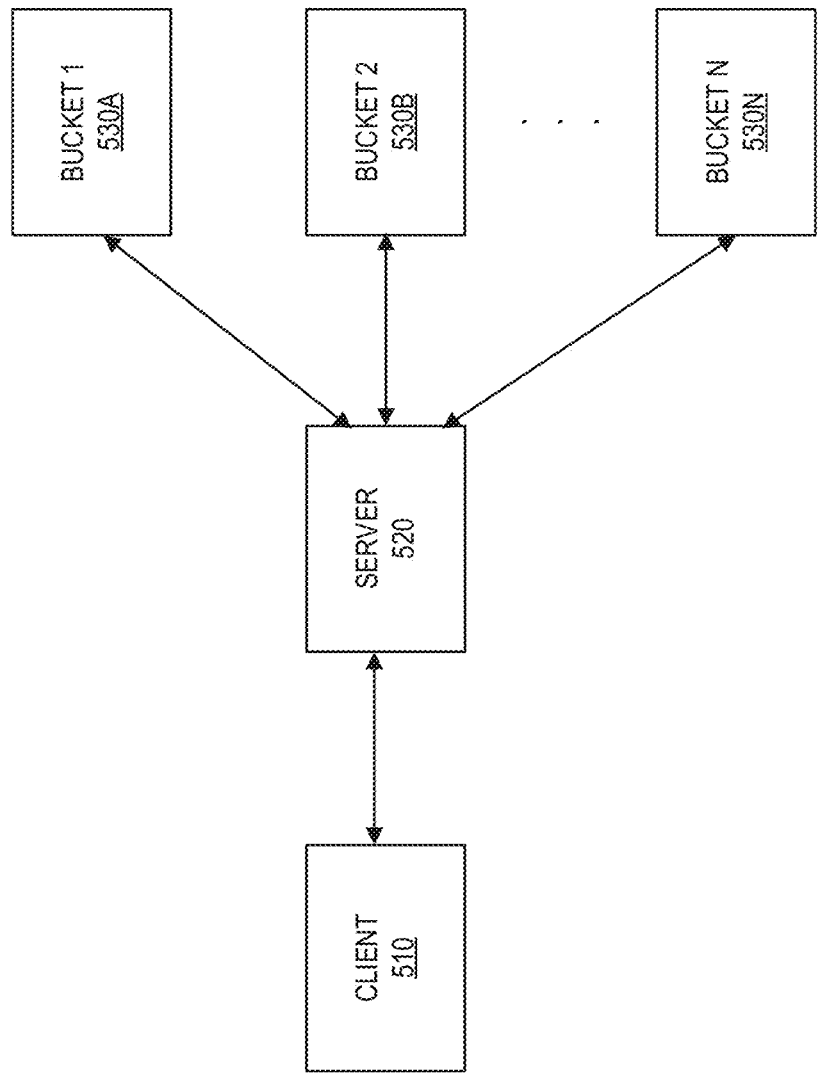
FIG. 5 is a block diagram of a PIR system that amortizes query processing in accordance with respective examples.

FIG. 5 is a block diagram of a PIR system that amortizes query processing in accordance with respective examples. A server 520 may store or manage an n-element database, with elements being spread across various buckets 530A, 530B, . . . , and 530N. In some examples, the elements are stored in an encrypted format, such that the server 520 does not have access to the unencrypted elements. A client 510 may send one or more queries to the server 520. The queries are encrypted by the client 510, such that the server 520 cannot determine what elements the client 510 is retrieving. Using homomorphic operations, the server 520 processes the one or more queries to return to the client 510 the desired elements. To ensure privacy, the one or more queries received by the server 520 cause the server to query each of the buckets 530A, 530B, . . . , and 530N. Accordingly, the server 520 is unable to learn anything about the query since each bucket is queried. The server 520 may know what elements are stored in each bucket, such that if each bucket was not queried, the server 520 would gain some insight into the query.

In an example, queries used in the existing XPIR system are compressed. TABLE 1 below provides a sketch of the protocol used in XPIR. XPIR's protocol is an additively homomorphic cryptosystem with algorithms (KeyGen, Enc, Dec), where (pk, sk) is the public and secret key pair generated using KeyGen. The client runs the QUERY and EXTRACT procedures, and the server runs the SETUP and ANSWER procedures. Each element in DB is assumed to fit inside a single ciphertext. Otherwise, each element can be split into l smaller chunks, and Lines 11 and 12 can be performed on each chunk individually; in this case ANSWER would return l ciphertexts instead of one.

A key idea in XPIR is to perform the encryption and homomorphic operations using a lattice-based cryptosystem, and preprocess the database in a way that greatly reduces the cost of the operations in Lines 11 and 12 in TABLE 1.

TABLE 1

CPIR protocol

1: function SETUP(DB)
2:     Represent DB in an amenable format
3:
4: function QUERY(pk, idx, n)
5:     for i = 0 to n − 1 do
6:         $c_i \leftarrow$ Enc(pk, i == idx? 1 : 0)
7:     return q ← $\{c_0, \ldots, c_{n-1}\}$
8:
9: function ANSWER(q = $\{c_0, \ldots, c_{n-1}\}$, DB)
10:     for i = 0 to n − 1 do
11:         $a_i \leftarrow DB_i \cdot c_i$ // plaintext-ciphertext multiplication
12:     return a ← $\Sigma_{i=0}^{n-1} a_i$     // homomorphic addition
13:
14: function EXTRACT(sk, a)
15:     return Dec(sk, a)

A major drawback of XPIR is network costs. The query sent by the client is large: in the basic scheme, the query contains one ciphertext (encrypting 0 or 1) for each entry in an n-element database. Furthermore, lattice-based cryptosystems have a high expansion factor, F, which is the size ratio between a ciphertext and the largest plaintext that can be encrypted; for recommended security parameters, F≥6.4.

To improve network costs, a query may be represented using $d\sqrt[d]{n}$ ciphertexts, instead of n, for any positive integer d. Unfortunately, representing a query this way increases the response size exponentially from 1 to $F^{d-1}$ ciphertexts. To minimize network costs, a value of d=2 or 3 is used in XPIR for evaluated databases. As a result, even with this technique the query vector is made up of hundreds or thousands of ciphertexts.

In an example, the query is compressed such that the client sends one ciphertext containing an encryption of its desired index i to the server. The server may then inexpensively evaluate a function EXPAND that outputs n ciphertexts containing an encryption of 0 or 1, where the ith ciphertext encrypts 1 and others encrypt 0. The server can then use these n ciphertexts as a query and execute the protocol as before (TABLE 1, Line 9).

One way to construct EXPAND is to create a Boolean circuit that computes the following function: "if the index encrypted by the client is i return 1, else return 0". The server may then evaluate this circuit on the client's ciphertext using a fully homomorphic encryption (FHE) scheme passing in values of i∈[0, n−1] to obtain the n ciphertexts. Unfortunately, this approach is very expensive. First, FHE supports addition and multiplication operations, but not Boolean operations (AND, XOR, etc.), which are needed for comparisons. As a result, the client may express its index as a bit string and encrypt each bit individually, resulting in a query of log(n) ciphertexts. Second, to operate on these encrypted bits, the server emulates Boolean operations using addition and multiplication, resulting in a O(log(n))-depth circuit with a large constant. Finally, this circuit is evaluated n times, one for each possible value of i.

Another way to construct EXPAND is to rely on FHE but does not require encrypting each bit of the index individually, emulating Boolean gates, or performing any homomorphic multiplications. This last point is important for performance, since homomorphic multiplications may be very expensive and require using larger security parameters. The underlying cryptosystem used by XPIR is an FHE scheme, which can be used to implement EXPAND. In another example, EXPAND may be implemented using the known SEAL homomorphic library which implements a Fan-Vercauteren (FV) cryptosystem.

In FV, plaintexts are polynomials of degree at most N with integer coefficients modulo t. The polynomials are from the quotient ring $R_t = \mathbb{Z}_t[x]/(x^N+1)$, where N is a power of 2, and t is the plaintext modulus that determines how much data can be packed into a single FV plaintext. Regular binary data, for example a PDF file, may be encoded in an FV plaintext. This encoding is described in greater detail below.

Ciphertexts in FV consist of two polynomials, each in $R_q = \mathbb{Z}_q[x]/(x^N+1)$ Here q is the coefficient modulus that affects how much noise a ciphertext can contain and the security of the cryptosystem. When a ciphertext is created, the ciphertext contains noise that increases as operations are performed on the ciphertext. Once the noise passes a threshold the ciphertext cannot be decrypted. The noise growth of operations depends heavily on t. Accordingly, there are advantages to keeping t small. However, a lower t means that more FV plaintexts are needed to represent the binary data (PDF, movie, etc.). A larger q supports more noise, but results in lower security. The expansion factor is $F = 2 \log(q)/\log(t)$.

In addition to the standard operations of a cryptosystem (key generation, encryption, decryption), FV also supports homomorphic addition, multiplication, and relinearization, which is performed after multiplications to keep the number of polynomials in the ciphertext at two. The following operations are used in various examples:

Addition: Given ciphertexts c1 and c2, which encrypt FV plaintexts $p1(x), p2(x) \in R_t$, the operation c1+c2 results in a ciphertext that encrypts their sum, $p1(x)+p2(x)$.

Plaintext multiplication: Given a ciphertext c that encrypts $p1(x) \in R_t$, and given a plaintext $p2(x) \in R_t$, the operation $p2(x) \cdot c$ results in a ciphertext that encrypts $p1(x) \cdot p2(x)$.

Substitution: Given a ciphertext c that encrypts plaintext $p(x) \in R_t$ and an odd integer a, the operation Sub(c, a) returns an encryption of $p(x^a)$. For instance, if c encrypts $p(x) = 7 + x^2 + 2x^3$, then Sub(c, 3) returns an encryption of $p(x^3) = 7 + (x^3)^2 + 2(x^3)^3 = 7 + x^6 + 2x^9$.

In an example, the implementation of the substitution group operation is based on a plaintext slot permutation technique described in greater detail below. Fortunately, substitution requires only a subset of the operations needed by arbitrary permutations in known techniques. Substitution, therefore, can be implemented very efficiently, as shown in the last row of TABLE 2. TABLE 2 shows the costs of operations in various examples.

TABLE 2

| Operation | CPU costs (ms) | Noise growth |
|---|---|---|
| Addition | 0.002 | Additive |
| Plaintext multiplication | 0.141 | Multiplicative |
| Multiplication | 1.514 | Multiplicative |
| Substitution | 0.279 | Additive |

A client that wishes to retrieve the ith element from the server's database using disclosed embodiments generates an FV plaintext that encodes the ith index. The client does so by representing $i \in [0, n-1]$ as the monomial $x^i \in R_t$. The client then encrypts this plaintext to obtain query=$Enc(x^i)$, which is then sent to the server. In some cases, the database is so large that the index cannot be represented by a single FV plaintext. These cases are discussed in greater detail below.

To explain how the server expands query=$Enc(x^i)$ into a vector of n ciphertexts where the ith ciphertext is $Enc(1)$ and all other are $Enc(0)$, a description for n=2 is provided. The server receives query=$Enc(x^i)$, with $i \in \{0, 1\}$ in this case (since n=2) as the client's desired index. The server first expands query into two ciphertexts $c_0$=query and $c_1$=query $x^1$:

$$c_0 = \begin{cases} Enc(1) & \text{if } i = 0 \\ Enc(0) & \text{if } i = 1 \end{cases}$$

$$c_1 = \begin{cases} Enc(x^i \cdot x^{-1}) = Enc(x^{-1}) & \text{if } i = 0 \\ Enc(x^i \cdot x^{-1}) = Enc(1) & \text{if } i = 1 \end{cases}$$

The server computes $c_j' = c_j + \text{Sub}(c_j, N+1)$ for $j \in \{0, 1\}$. Since operations in $R_t$ are defined modulo $x^N+1$, a substitution with N+1 transforms the plaintext encrypted by $c_0$ and $c_1$ from $p(x)$ to $p(-x)$. Specifically:

$$c_0' = \begin{cases} Enc(1) + Enc(1) = Enc(2) & \text{if } i = 0 \\ Enc(x) + Enc(-x) = Enc(0) & \text{if } i = 1 \end{cases}$$

$$c_1' = \begin{cases} Enc(x^{-1}) + Enc(-x^{-1}) = Enc(0) & \text{if } i = 0 \\ Enc(1) + Enc(1) = Enc(2) & \text{if } i = 1 \end{cases}$$

Assuming t is odd, the multiplicative inverse of 2 in $\mathbb{Z}_t$, say $\alpha$, can be computed and encoded as the monomial $\alpha \in R_t$, and compute $o_j = \alpha \cdot c_j'$. The values $o_0$ and $o_1$ contain the desired output of EXPAND: $o_i$ encrypts 1, and $o_{1-i}$ encrypts 0.

This approach can be generalized to any power of 2 if $n \leq N$. In cases where n is not a power of 2, the next power of 2 may be used, and the first n output ciphertexts as the client's query. TABLE 3 gives the generalized algorithm, and FIG. 1 depicts an example for a database of four elements.

TABLE 3

```
1:   function EXPAND(query = Enc(x^i))
2:       find smallest m = 2^l such that m ≥ n
3:       ciphertexts ← [query]
4:       // each outer loop iteration doubles the number of ciphertexts,
5:       // and only one ciphertext ever encrypts a non-zero polynomial
6:       for j = 0 to l - 1 do
7:           for k = 0 to 2^j - 1 do
8:               c_0 ← ciphertexts[k]
9:               c_1 ← c_0 · x^(-2^j)
10:              c'_k ← c_0 + Sub(c_0, N/2^j + 1)
11:              c'_{k+2^j} ← c_1 + Sub(c_1, N/2^j + 1)
12:              ciphtertexts ← [c'_0, ... , c'_{2^{j+1}-1}]
13:      // ciphertext at position j encrypts m and all others encrypt 0
14:      inverse ← m^(-1) (mod t)
15:      for j = 0 to n - 1 do
16:          o_j ← ciphertexts[j] · inverse
17:      return output ← [o_0, ..., o_{n-1}]
```

FIG. 1 is an example of expanding an initial plaintext query in accordance with respective examples. Specifically, FIG. 1 shows the effect on a plaintext query/vector on each iteration of EXPAND's outer loop, lines 6-12 in TABLE 3. FIG. 1 is based on a four-element database, with an initial query 110 index of two. The initial query 110 includes a 1 at index 2, indicating that the element at index 2 within the database should be returned. With a four-element database, the outer loop in EXPAND will run two times. Expanded query 120 is the result of the first outer loop run. Expanded query 130 is the result of the second outer loop run. The expanded queries 120 and 130 are a polynomial represented as an array of coefficients. While FIG. 1 shows the plaintext, the server would only see the corresponding ciphertexts that are not shown. The inverse, line 14 of TABLE 3, of the expanded query 130 is then done and shown as expanded query 140. The expanded query 140 has a 1 at index position 2, corresponding with the initial query 110.

One issue with EXPAND is that despite each operation being inexpensive (TABLE 2), O(n) operations are used to extract the n-entry query vector. This is undesirable, since EXPAND could end up being more expensive to the server than computing the answer to a query (see TABLE 1, Line 9). This cost can be reduced by having the client send multiple ciphertexts.

The structure of the database may be changed to handle multiple ciphertexts. One modification to the protocol in TABLE 1 is to structure the database DB as a matrix M: each cell in M is a different element in the DB. The client may then send two query vectors, $v_{row}$ and $v_{col}$, each of size. The vector $v_{row}$ has the encryption of 1 at position r, while $v_{col}$ has the encryption of 1 at position c, where M[r,c] is the desired element. The server, upon receiving $v_{row}$ and $v_{col}$, computers the matrix-vector product: where each multiplication is between a plaintext and a ciphertext, and additions are on ciphertexts. The vector is a vector containing the encryption of all entries in column c of M.

The server then performs a similar step using Ac and $v_{row}$. There is, however, one technical challenge: each entry in is a ciphertext, which is too big to fit inside another ciphertext. For example, the largest plaintext that can fit in a ciphertext has size |ciphertext|/F. In an example, the server splits elements in $A_c$ into F chunks, so can be thought of as √n a by F matrix. The server may then repeat the process as before on the transpose of this matrix. Accordingly, $A_c^T \cdot v_{row}$ is calculated to yield a vector of F ciphertexts. These ciphertexts may be sent by the server to the client. The client may then decrypt all of the ciphertexts and combines the results to obtain Enc(M[r,c]). The client may then decrypt Enc(M[r,c]) to obtain the desired element in the database M[r,c]. The procedure may be generalized by structuring the database as a d-dimensional hypercube and having the client send d query vectors of size $\sqrt[d]{n}$. In response, the server returns $F^{d-1}$ ciphertexts as the response.

In an example, the above scheme is used to reduce the computational cost of EXPAND, compared to using the above technique to reduce network costs by reducing the size of the query vector. Instead of encoding one index, the client encodes d indices (on different ciphertexts), one for each dimension of the database. The server may then call EXPAND on each of the d ciphertexts, and extracts a $\sqrt[d]{n}$-entry vector from each ciphertext. The server uses the above scheme with the extracted d vectors, which results in the CPU cost of EXPAND being $O(d\sqrt[d]{n})$. A side-effect of this approach is that the PIR response gets larger due to the cryptosystem's expansion factor, F. Specifically, the network cost is d ciphertexts to encode the indices, and $F^{d-1}$ ciphertexts to encode the response. For small values of d, e.g., 2 or 3, computational savings are achieved while also reducing network costs by orders of magnitude over XPIR.

As noted above, indexing large databases can be difficult. The query vector that EXPAND can generate is bounded by N, which bounds the degree of the polynomials used in FV. Recommended security parameters set N to 2048 or 4096. Larger values of N improve security but reduces performance. In various examples, databases may have more than N elements.

In one example, the client may send multiple ciphertexts and the server expands the ciphertexts and concatenates the results. As an example, if N is 2048, the database has 4096 elements, and the client wishes to get the element at index 2050, the client sends two ciphertexts: the first encrypts 0 and the second encrypts $x^2$. The server expands both ciphertexts into two 2048-entry vectors and concatenates them to get a 4096-entry vector where the entry at index 2050 encrypts 1, and all entries encrypt 0.

In another example, the database is represented as a d-dimensional hypercube as discussed above. This allows the client to send d ciphertexts to index a database of size $N^d$. For d=2 and N=4096, two ciphertexts are sufficient to index 16.7 million entries. In addition, a combination of these solutions may be used. For example, given a database with 230 entries, d=2 could be used, so the database is a $2^{15} \times 2^{15}$ matrix), and will represent the index for each dimension using $2^{15}/4096=8$ ciphertexts. The server expands these 8 ciphertexts and concatenates them to obtain a vector of 215 entries. In total, this approach requires the client to send 16 ciphertexts as the query (8 per dimension), and receive F≈7 ciphertexts as the response (d=3 would lead to 3 ciphertexts as the query, but $F^2$ ciphertexts as the response).

In addition to using expanded queries, amortizing computational costs of multiple queries may be used to save computational resources. Answering a PIR query uses computation resources that are linear to the size of the database. One way to save computational resources is for the server to amortize costs by processing a batch of queries. Batch codes are a data encoding that, among other applications, can be used to achieve this goal. The server can use a batch code to encode its database in a way that the server can answer a batch of queries more cheaply (computationally) than answering each query individually. Unfortunately, known batch code methods do not focus on PIR amortization. Instead, known batch code methods target load balancing in distributed storage systems and network switches, which have different requirements compared to PIR query processing. Using known batch code methods to amortize PIR query processing would incur prohibitive network costs.

To reduce the network costs of using batch codes, certain guarantees of batch codes are not necessary for many PIR-backed systems. Relaxing those guarantees leads to constructions that are not only asymptotically better, but also concretely efficient-without compromising the functionality of the target system. Below is a description of batch codes that highlights the sources of overhead.

A (n, m, k, b)-batch code takes as input a collection DB consisting of n elements and produces a set of m codewords C. These codewords are then distributed among b buckets. Formally, $\mathcal{B}$ DB→$(C_0, \ldots, C_1)$, where $C_i$ is the number of codewords in bucket i, and the sum of codewords across all buckets is $m=\Sigma_{i=0}^{b-1}|Ci|\geq n$. The goal of these batch codes is two-fold. First, the batch codes ensure that any k elements from the DB can be retrieved from the b buckets by fetching at most one codeword from each bucket. Second, the batch codes keep the number of total codewords, i.e., m, lower than k*n.

As example, consider a (4,6,2,3)-batch code. Let DB={$x_1$, $x_2$, $x_3$, $x_4$}. For the encoding, the DB is split in half to produce two buckets, and the XOR of the entries in these buckets produces elements that are placed in a third bucket: $\mathcal{B}$ (Db)={$x_1$, $x_2$), ($x_3$, $x_4$), ($x_1 \oplus x_3$, $x_2 \oplus x_4$). Any two elements may be obtained from the database by querying each bucket at most once. For example, to obtain $x_1$ and $x_2$, $x_1$ could be retrieved from the first bucket, $x_4$ from the second bucket, and $x_2 \oplus x_4$ from the third bucket. Then $x_2$ could be calculated as $x_4 \oplus (x_2 \oplus x_4)$.

The above encoding is useful for PIR as two elements from the DB may be returned by issuing a single query to each bucket. In the example above, each bucket may be thought of as a two-element database. Accordingly, the query would search over six elements. A single four-element database to return two elements, would require searching over eight elements. Accordingly, the above encoding results in 25% fewer computations.

TABLE 4 depicts the relationship between the number of codewords (m) and the number of buckets b, as a function of the database size (n) and the batch size (k) for several constructions. In multi-query PIR, the client issues one query to each of the b buckets, and therefore receives b responses. To answer these b queries, the server computes over all m codewords exactly once; lower values of m lead to less computation, and lower values of b lead to lower network costs. Since m<k·n, the total computation done by the server is lower than answering each of the k queries individually without a batch code. The drawback is that existing batch codes produce many buckets (cubic or worse in k). As a result, they introduce significant network overhead over not using a batch code at all.

TABLE 4

| Batch code | Codewords(m) | Buckets(b) | Probability of failure(p) |
|---|---|---|---|
| Subcube($\ell \geq 2$) | $n \, (\ell/(\ell+1))^{log2(k)}$ | $(\ell+1)^{log2(k)}$ | 0 |
| Combinatorial | $kn - (k-1) \cdot \binom{r}{k-1}$ | r | 0 |
| $\left(\binom{r}{k-1} \leq n/k(k-1)\right)$ | | | |
| Balbuena graphs | $2(k^3 - k \cdot \lceil n/(k^3 - k) \rceil)$ | $2(k^3 - k)$ | 0 |
| Pung hybrid | 4.5n | 9k | $\approx 2^{-20}$ |
| 3-way cuckoo hasing in the head | 3n | 1.3k | $\approx 2^{-20}$ |

In an example, probabilistic batch codes are used. A probabilistic batch code (PBC) differs from a traditional batch code in that it fails to be complete with probability p. That is, a collection encoded with a PBC may have no way to recover a specific set of k elements by retrieving exactly one codeword from each bucket. The probability of encountering one such set is p. In the four-element database example above, this means that under a PBC, a client may be unable to retrieve both $x_1$ and $x_2$ by querying each bucket at most once, whereas a traditional batch code guarantees that this is always possible. In practice, this is not an issue as parameters may be used that result in roughly one in a trillion queries failing. If a failure does occur, a client learns whether or not it all of the elements can be retrieved before issuing any queries.

Formally, a PBC may use three polynomial time algorithms. A (n,m,k,b,p)-PBC is given by the three functions Encode, GenSchedule, and Decode. These functions may be defined as: $(C_o, \ldots, C_{b-1}) \leftarrow$Encode(DB): Given an n-element collection DB, output a b-tuple of buckets, where b≥k. Each bucket contains zero or more codewords and the total number of codewords across all buckets is $m=\Sigma_{i=0}^{b-1}|C_i| \geq n$. $(\sigma, \perp) \leftarrow$GenSchedule(I): Given a set of k indices I corresponding to the positions of elements in DB, output a schedule $\sigma \rightarrow \{0, \ldots, b-1\}$. The schedule $\sigma$ gives, for each position $i \in I$, the index of one or more buckets from which to retrieve a codeword that can be used to reconstruct element DB[i]. GenSchedule outputs $\perp$ if GenSchedule cannot produce a schedule where each index $\in I$ is associated with at least one bucket, and where no bucket is used more than once. This failure event occurs with probability p.

element←Decode(w): Given a set of codewords, Decode outputs the corresponding element ∈DB.

Batch codes are designed to spread out elements in a clever way such that retrieval requests are well-balanced among the buckets. Relatedly, many data structures and networking applications use different variants of hashing: consistent, asymmetric, weighted, multi-choice, cuckoo, and others to achieve the same goal. In an example, a PBC is created using a hashing in the head technique. The PBC may then be used to implement a multi-query PIR.

A common use case for non-cryptographic hash functions is to build efficient data structures such as hash tables. In a hash table, the insert procedure consists of computing one or more hash functions on the key of the item being inserted. Each application of a hash function returns an index into an array of buckets in the hash table. The item is then placed into one of these buckets following an allocation algorithm. For example, in multi-choice hashing, the item is placed in the bucket least full among several candidate buckets. In Cuckoo hashing, items are moved around following the Cuckoo hashing algorithm.

An ideal allocation results in items being assigned to buckets such that all buckets have roughly the same number of items since this lowers the cost of lookup. In practice, collisions are frequent and many items might map to the same bucket. To look up an item by its key, the different hash functions on the key are computed to obtain the list of buckets in which the item could have been placed. Those buckets may then be scanned for the desired item. An example of the insertion process for multi-choice hashing is given in FIG. 2.

Figure 2:
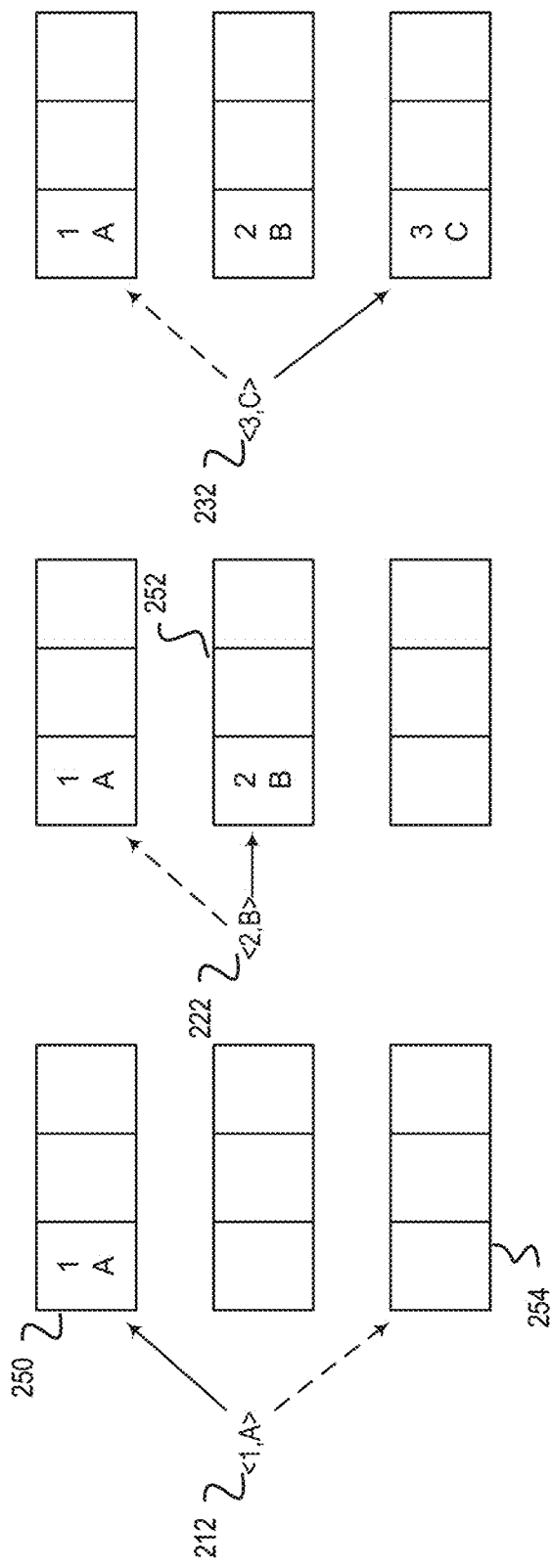
FIG. 2 is an example two-choice hashing allocation in accordance with respective examples.

FIG. 2 is an example two-choice hashing allocation in accordance with respective examples. The example two-choice hashing places a value into one of three buckets 250, 252, or 252. Each key is used to determine one of two buckets to put a value into. In an example, the bucket with the least number of values is where the value is placed. For example, using the key of a key-value pair 212, buckets 250 and 252 are selected as possible buckets. Bucket 250 is selected, shown by the solid arrow, while bucket 254 is the second, unused choice, shown by the dotted arrow. A second key-value pair 222 is determined to be placed in either bucket 250 or 252. As bucket 250 already have a stored value, bucket 252 is selected. A third key-value pair 232 is determined to be placed in either bucket 250 or 254. As bucket 254 is empty, the third key-value pair 232 is stored in the third bucket 254.

Inserting an element into a hash table may be thought of as solving an instance of the classic n balls and b bins problem. The items to be inserted into a hash table are the n balls, and the buckets in the hash table are the b bins; using w hash functions to hash a key to w candidate buckets approximates an independent and uniform random assignment of a ball to w bins. The number of collisions in a bucket is the load of a bin, and the highest load across all bins is the max load. In the worst case, the max load is n/w where all balls map to the same w candidate buckets, but there are useful bounds that hold with high probability.

Interestingly, examining other scenarios abstracted by the balls and bins problem shows a pattern: the allocation algorithm is always executed during data placement. In the hash table example, the allocation algorithm determines where to insert an element. In the context of a transport protocol, the allocation algorithm dictates on which path to send a packet. In the context of a job scheduler, the allocation algorithm selects the server on which to run a task. The result is that the load balancing effect is achieved at the time of "data placement." However, to build a PBC, load balancing is done at the time of "data retrieval." Hashing in the head achieves this.

Hashing in the head may be explained by introducing two principals: the producer and the consumer. The producer holds a collection of n items where each item is a key-value tuple. The producer is in charge of data placement: taking each of the n elements and placing them into one of b buckets based on their keys, e.g., insert procedure in a hash table. The consumer holds a set of k keys (k≤n), and handles data retrieval. The consumer fetches items by their key from the buckets that were populated by the producer, e.g., lookup procedure in a hash table. In an example, the goal is for the consumer to get all k items by probing each bucket as few times as possible. That is, the consumer has an instance of a k balls and b bins problem, and the goal is to reduce its max load.

Note the consumer is not inserting elements into buckets, rather that is what the producer does. Instead, the consumer is placing "retrieval requests" into the buckets. The challenge is that any clever allocation chosen by the consumer must be compatible with the actions of the producer who populates the buckets. That is, if the consumer, after running its allocation algorithm, e.g., multi-choice hashing, decides to retrieve items $x_1$, $x_2$, and $x_3$, from buckets 2, 3, and 7, then the producer should have previously placed those elements in those exact buckets.

An example protocol that guarantees this compatibility starts with the consumer imagining in its head that it is a producer with a collection of k elements. The consumer converts its k keys into k key-value tuples by assigning a dummy value to each key. The value may be a dummy value since the consumer does not know actual values. In this simulation, the consumer follows a specific allocation algorithm, e.g., 2-choice hashing, cuckoo hashing, etc., and populates the b buckets accordingly. The result is an allocation that balances the load of the k elements among the b buckets. The consumer then ends its simulation and uses the resulting allocation to fetch the k elements from the buckets that were populated by the real producer.

Guaranteeing that the consumer's allocation is compatible with the producer's actions is challenging. One reason is that the consumer's simulation is acting on k items whereas the real producer is acting on n items. If the allocation algorithm being used by the consumer and the producer is randomized or depends on prior choices, which is the cases with most multi-choice hashing schemes, the allocations may be different. Indeed, observe that if a producer generates the allocation in FIG. 2, the allocation would not be compatible with the consumer's simulation in FIG. 3 despite both entities using the same algorithm. This is because the producer places the item under key "2" in the middle bucket, but the consumer's simulation maps it to the top bucket.

Figure 3:
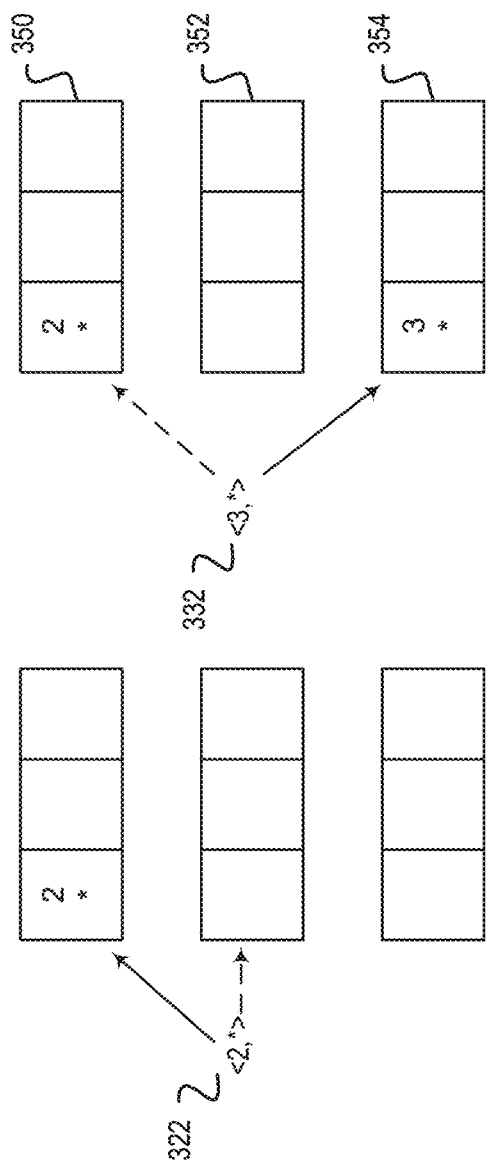
FIG. 3 is an example consumer's allocation simulation in accordance with respective examples.

FIG. 3 is an example consumer's allocation simulation in accordance with respective examples. In FIG. 3, two key-value pairs 322 and 332 are stored into three buckets 350, 352, and 354. In this example, the value is an *, which indicates that the value is not known. Accordingly, an arbitrary value of * is used. The two key-value pairs 322 and 332 have the same key value as 222 and 232 from FIG. 2. Note, that the key-value pair 212 is not present in FIG. 3. The missing key-value pair 212 is what will account for different allocations between FIG. 2 and FIG. 3. The first key-value pair 322 may be store in bucket 350 or 352, which is the same as the key-value pair 222 in FIG. 2. Unlike FIG. 2, there is no value stored in bucket 350, so the key-value pair 322 is stored in bucket 350. The second key-value pair 332 may be stored in bucket 350 or 354, which is the same as the key-value pair 232 in FIG. 2. The second key-value pair 332 is stored in the bucket 354 since there is already a key-value pair stored in the bucket 350. FIG. 3 presents an example, where the consumer's simulation may be different from a two-hashing allocation, such as the example from FIG. 2.

To guarantee compatibility, the producer follows the same allocation algorithm as the consumer's simulation, e.g., 2-choice hashing, on its n elements but stores the elements in all candidate buckets. That is, whenever the algorithm chooses one among w candidate buckets to store an element, the producer stores the element in all w buckets. This ensures that regardless of which k elements are part of the consumer's simulation or which non-deterministic choices the algorithm makes, the allocations are always compatible, see FIG. 4. Of course, this means that the producer is replicating elements, which defeats the point of load balancing. However, PBCs only need load balancing during data retrieval.

Figure 4:
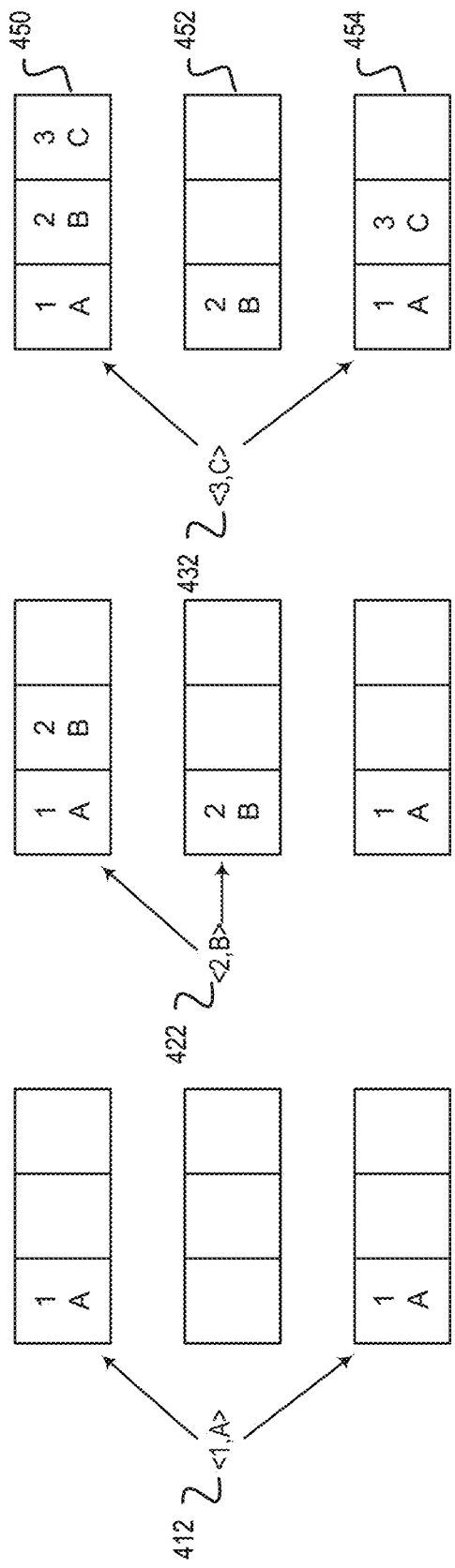
FIG. 4 is an example producer's allocation in accordance with respective examples.

FIG. 4 is an example producer's allocation in accordance with respective examples. FIG. 4 provides an example modification to the two-hashing allocation such that the producer's allocation is compatible with the consumer's simulation. FIG. 4 corresponds with storing the same three key-value pairs as in FIG. 2, but creates an allocation that is compatible with the consumer's simulation in FIG. 3. To create a compatible allocation, the key-value pairs are stored in both buckets. A first key-value pair 412, corresponding with the key-value pair 212, is stored in both buckets 450 and 454. A second-key value pair 422, corresponding with the key-value pair 222, is stored in both buckets 450 and 452. And a third-key value pair 432, corresponding with the key-value pair 232, is stored in both buckets 450 and 454. The allocation shown in FIG. 4 is therefore compatible with the consumer's simulation in FIG. 3. That is, a bucket where a key-value is stored in FIG. 3 will be stored in the same bucket in FIG. 4. This is not the case with FIG. 2.

In an example, cuckoo hashing is used to allocate balls to bins. In other examples, different hashing algorithms may be used. In cuckoo hashing algorithm, given n balls, b buckets, and w independent hash functions $h_0, \ldots, h_{w-1}$, compute w candidate buckets for each ball by applying the w hash functions: $h_i(b)$ mod b. For each ball x, place x in any empty candidate bucket. If none of the w candidate buckets are empty, select one of the candidate buckets at random, remove the ball currently in that bucket ($x_{old}$), place x in the bucket, and re-insert $x_{old}$ as before. If re-inserting $x_{old}$ causes another ball to be removed, this process continues recursively for a maximum number of rounds. If this maximum number is reached, the algorithm aborts.

In an example, PC may be constructed as follow. Let H be an instance (producer, consumer) of hashing in the head where the allocation algorithm is Cuckoo hashing with w hash functions and b bins. A (n, m, k, b, p)-PBC may be constructed as follows.

Encode(DB). Given a collection DB of n elements, follow H's producer algorithm to allocate the n elements to the b buckets. This results in m=wn total elements distributed across the b buckets. Each bucket may contain a different number of elements. Return the buckets.

GenSchedule(I). Given a set of indices I, follow H's consumer algorithm to allocate the k indices to the b buckets. Return the mapping of indices to buckets. If more than one index maps to the same bucket, i.e., if there are collisions, return ⊥ instead.

Decode(W). Since Encode performs only replication, all codewords are elements in the DB and require no decoding. Furthermore, a, which is returned by GenSchedule, has only one entry for each index. As a result, W contains only one codeword. Decode returns that codeword.

Analyzing the exact failure probability of Cuckoo hashing remains an open problem. However, several works have estimated this probability empirically for different parameter configurations. Following known analysis in, the parameters w=3 and b=1.3 k may be chosen. In this setting, the failure probability is estimated to be p≈$2^{-40}$. This means that, assuming the mapping from indices to buckets is pseudorandom, the probability that GenSchedule(I) returns for a set of indices I is p. TABLE 4 compares this result with existing batch code constructions and the scheme proposed in Pung.

Query compression and amortizing computational costs may be combined in a PIR system. TABLE 5 provides pseudocode for a PBC-base multi-query CPIR scheme, where I is the set of k desired indices and M is the set of bucket lengths. At a high level, the server encodes its database by calling the PBC's Encode procedure. This produces a set of buckets, each of which can be treated as an independent database on which clients can perform PIR. A client who wishes to retrieve elements at indices I= $\{i_0, \ldots, i_{k-1}\}$ may then locally call GenSchedule(I) to obtain a schedule a. This schedule states, for each index, the bucket from which to retrieve an element using PIR. Because of the semantics of GenSchedule it is guaranteed that no bucket is queried more than once or σ=⊥. As a result, the client may run one instance of PIR on each bucket. However, a challenge is determining which index to retrieve from each bucket: by assumption of PIR the client knows the index in DB, but this has no relation to the index of that same element in each bucket. To address this, an oracle, described below, provides this information. If the client has nothing to retrieve from a given bucket, the client simply queries a random index for that bucket. This ensures privacy such that any server does not realize that the elements in a bucket are not needed by the client.

TABLE 5

```
1:  function SETUP(DB)
2:      (C_0, ..., C_{b-1}) ← Encode(DB)
3:      for j = 0 to b - 1 do
4:          SETUP(Cj) // See TABLE 1, Line 1
5:
6:  function MULTIQUERY(pk, I, M = {|C_0|, ..., |C_{b-1}|})
7:      σ ← GenSchedule(I)
8:      if σ ≠ ⊥ then
9:          // get an element for each bucket
10:         // pick a random index if the bucket is not used in σ
11:         for j = 0 to b - 1 do
17:             idx_j ← index for bucket j (based on σ and 𝒪)
13:             q_j ← QUERY(pk, idx_j, |C_j|) // see TABLE 1, Line 4
14:         return q ← (q_0, . . . , q_{b-1})
15:     else
16:         deal with failure
17:
18:     function MULTIANSWER(q, (C_0, . . . , C_{b-1}))
19:         for j = 0 to b - 1 do
20:             aj ← ANSWER(q_j, C_j)      //see TABLE 1, Line 9
21:         return a ← (a_0, . . . , a_{b-1})
22:
23:     function MULTIEXTRACT(sk, a, I, σ)
24:         // extract the codewords from the provided PIR answers into cw
25:         for j = 0 to b - 1 do
26:             cw_j ← EXTRACT(sk, a_j)    // see TABLE 1, Line 14
27:         // select codewords from cw that are relevant to each index in I
28:         for i = 0 in k - 1 do
```

TABLE 5-continued

```
29:             W ← codewords from cw (based on σ[I_i])
30:             e_i ← Decode(W)
31:         return (e_0, . . . , e_{k-1})
```

There are several ways that the client may construct the oracle 𝒪. In an example, The simplest solution is to obtain the mapping from each bucket to the index of elements in DB. For example, items 3, 4, 5 in DB are in bucket 0; and items 3, 7, 5 in DB are in bucket 1, etc. While this might sound unreasonable, PIR has an implicit assumption that the client knows the index in the DB of the desired element. The client could use the same technique to obtain the corresponding w indices in (DB). For example, in the Pung communication system, clients may obtain this mapping in a succinct Bloom filter.

In another example, the client may fetch elements using PIR not by index but by some label using PIR-by-keywords. Examples of labels include the name or UUID of a movie, the index in the original DB, etc. In an example, the client may construct 𝒪 directly. In this example, the server may share with clients its source of randomness, e.g., a pseudorandom function seed and/or value. Clients may then simulate the server's encoding procedure on a database of n dummy elements, replicating each element into w candidate buckets, which yields 𝒪. Furthermore, this process is incremental for many hashing schemes: if a client has 𝒪 for an n-element database, the client can construct 𝒪 for a database with n+1 elements by simulating the insertion of the last element.

If the PBC being used has p>0, then it is possible that for a client's choice of indices, σ=⊥. In this case, the client is unable to privately fetch all k elements. The client, however, knows of the failure before issuing any PIR query, see TABLE 5, Line 8. As a result, the client has a few options. First, the client may adjust its set of indices, i.e., choose different elements to retrieve. This is possible in applications where the client needs to retrieve more than a batch of k items. Second, the client may retrieve a subset of the elements. In a messaging application, this would mean that the client would not retrieve all unread messages. In many cases, this is acceptable since messages are not ephemeral so the client can try again at a later time with a new set of indices. Lastly, the client can fail silently. Which of these strategies is taken by a client depends on the application.

Figure 6:
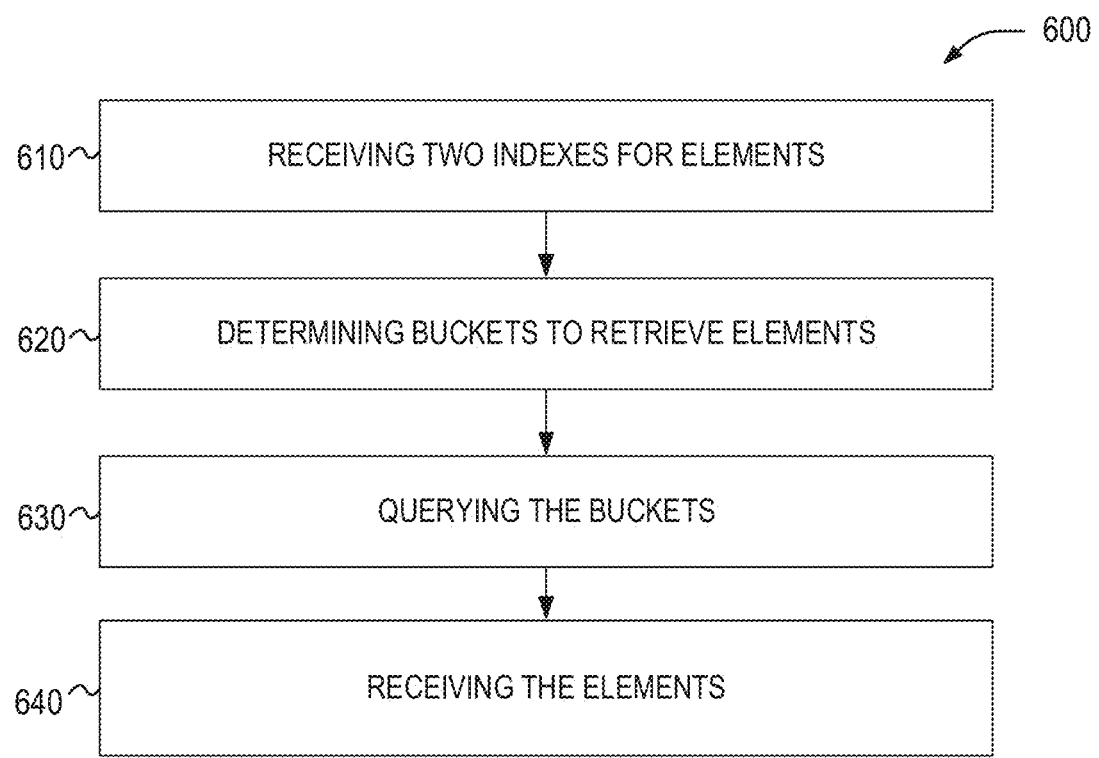
FIG. 6 is a flow diagram of a process for amortizing query processing in a PIR system in accordance with respective examples.

FIG. 6 is a flow diagram of a process for amortizing query processing in a PIR system in accordance with respective examples. At 610, at least two indexes for elements stored in an n-element database is received. The indexes may be received in a query. For example, the query may be a vector with a value of 1 for each element that is to be retrieved and 0 otherwise. This vector may be encrypted by a client. The server may use this encrypted vector without having to decrypt the vector. The n-element database may be encoded into at least three buckets. Each element is stored within at least two buckets. No bucket contains the entire n-element database. At 620, a bucket for each of the indexes is determined. The bucket stores the element that corresponds to the indexes, respectively. At 630, the determined buckets are queried to retrieve the elements. At 640, the elements are received. The received elements may be returned to the client. In an example, a received element may be a combination of two elements. In this case, the requested element may be calculated using the combined element and another element. For example, two elements may be XOR'd together into the combined element. Using the combined element and one of the two elements, XORing may be done to retrieve the second of the two elements.

In an experiment, an implementation called SealPIR which included various described features and was tested by implementing XPIR's protocol on top of version 2.3.0-4 of the SEAL homomorphic encryption library. SealPIR exposes the API described in TABLE 1 to applications. One difference with XPIR is that the substitution operation used in EXPAND requires a special cryptographic key, e.g., a Galois key, to be generated by the client and sent to the server. However, a client can reuse this key across any number of requests and the key is relatively small, ~2.9 MB.

In SealPR, an FV plaintext was represented as an array of 64-bit integers, where each integer is mod t. Each element in the array represents a coefficient of the corresponding polynomial. We encode an element e∈DB into FV plaintexts p(x) by storing log(t) bits of e into each coefficient of p(x). If elements were small, many elements were stored into a single FV plaintext. For example, the first element is stored in the first 20 coefficients, the second element in the next 20 coefficients, etc.

In FV, an encryption of 2l (mod $2^y$), for y≥1, is equivalent to an encryption of 1 (mod $2^{y-1}$). Note that in Lines 14-16 of TABLE 3, EXPAND multiplies the n ciphertexts by the inverse of m where m=2l. In an experiment, the plaintext modulus of the n ciphertexts was changed from $t=2^y$ to $t'=2^{y-1}$, which avoids the plaintext multiplications and the inversion, and reduces the noise growth of EXPAND. The result is n−1 ciphertexts encoding 0, and one ciphertext encoding l, as expected. This also allows use of any value of t and not just an odd integer since inverting m is avoided.

In addition to SealPIR, a multi-query PIR library based on PBCs was implemented, mPIR. mPIR implemented five different PBC constructions: each is a different instance of hashing in the head with different allocation algorithms (e.g., two-choice hashing, Cuckoo hashing, the Hybrid allocation scheme in Pung). mPIR works transparently on top of both XPIR and SealPIR. mPIR used SHA-256 with varying counters to implement the different hash functions.

SealPIR and mPIR were evaluated in various experiments to determine the benefits of multiple queries and amortizing the costs of handing the multiple queries. The results of the experiments provide answer to four different questions. First, what is the performance and what are the network costs of SealPIR, and how do they compare to XPIR. Second, what is the throughput and response time achieved by SealPIR on a variety of deployment scenarios. Third, what are the benefits provided by PBCs, and how do they compare to existing batch codes. Last, what is the impact of using SealPIR and mPIR on a representative system.

These experiments were done using Microsoft Azure instances in three data centers: West US, South India, and West Europe. The PIR servers were run on H16 instances (16-core 3.6 GHz Intel Xeon E5-2667 and 112 GB RAM), and clients were run on F16s instances (16-core, 2.4 GHz Intel Xeon E5-2673 and 32 GB RAM), all running Ubuntu 16.04. All reported network costs were measured at the application layer. In addition, each experiment was run ten times and averages from those ten runs were reported. Standard deviations were less than 10% of the reported means.

FHE's security parameters where chosen following XPIR's latest estimates. The degree of ciphertexts' polynomials was set to 2048, and the size of the coefficients was set to 60 bits (N and q as used above). Specifically, SEAL used values of q=1 (mod $2^{18}$), whereas XPIR used values of q=1 (mod $2^{14}$). A value of $q=2^{60}-2^{18}+1$ worked for both. Each database element was 288 bytes. For SealPIR, a plaintext modulus value of $t=2^{20}$ was used. For XPIR, >=16 was used, meaning that elements were packed into a single logical element, thereby reducing the number of elements in the database by a factor of. For 288-byte elements and the used security parameters, setting=16 has roughly the same effect as setting $t=2^{20}$ in SealPIR.

To evaluate SealPIR, a series of microbenchmarks were run that measured the time to generate, expand, and answer a query, the time to extract the response, and the time to preprocess the database. Several database sizes were used and the same experiment for XPIR using two different depth parameters d were tested. TABLES 6A-6C tabulates the results. The computational costs of the client were lower under SealPIR than under XPIR. This is because the client in SealPIR generates d cipher-texts as a query rather than $d\sqrt[d]{n}$ ciphertexts as in XPIR. Furthermore, XPIR produced larger answers, i.e., they contain more ciphertexts, which required more time to decrypt.

SealPIR's EXPAND procedure introduces CPU overhead to the server. Specifically, the overhead computing the query vector directly, as in XPIR, is between 8% and 31% depending on the database size. While this is high, there is a trade-off with the significant network savings. For the cost of answering a query, SealPIR is sometimes faster than XPIR, e.g., 24% faster at 65,536 elements, and sometimes slower, e.g., 33% slower at 1,048,576 elements when d=2, but only 4% slower when d=3. This is due to both systems having different code bases; the work they perform, for the same value of d, is identical so they should in principle achieve the same performance. Note that larger values of d lead to more computation for the server for two reasons. First, structuring the database as a d-dimensional hyperrectangle often requires padding the database with dummy plaintexts to fit all dimensions. Second, the ciphertext expansion factor effectively increases the size of the elements by a factor of F after processing each dimension, necessitating more computation.

For network costs, the query encoding and EXPAND procedure provide a significant benefit. For the larger databases, the query size reductions over XPIR are 256× when d=2, and 60.5× when d=3.

TABLE 6A

| XPIR (d = 2) | | | |
|---|---|---|---|
| | Database size(n) | | |
| | 65,536 | 262,144 | 1,048,576 |
| Client CPU costs(ms) | | | |
| Query | 18.43 | 44.16 | 90.39 |
| Extract | 0.86 | 0.86 | 0.86 |
| Server CPU costs (sec) | | | |
| Setup | 0.61 | 2.43 | 7.53 |
| Expand | n/a | n/a | n/a |
| Answer | 0.26 | 0.71 | 2.50 |
| Network costs (KB) | | | |
| Query | 4,096 | 8,192 | 16,384 |
| Answer | 512 | 512 | 512 |

TABLE 6B

XPIR (d = 3)

| | Database size(n) | | |
|---|---|---|---|
| | 65,536 | 262,144 | 1,048,576 |
| Client CPU costs(ms) | | | |
| Query | 7.51 | 11.26 | 20.08 |
| Extract | 6.03 | 6.61 | 6.91 |
| Server CPU costs (sec) | | | |
| Setup | 0.18 | 2.14 | 7.24 |
| Expand | n/a | n/a | n/a |
| Answer | 0.25 | 1.17 | 3.22 |
| Network costs (KB) | | | |
| Query | 1,248 | 2,464 | 3,872 |
| Answer | 3,424 | 3,872 | 3,872 |

TABLE 6C

SealPIR (d = 2)

| | Database size(n) | | |
|---|---|---|---|
| | 65,536 | 262,144 | 1,048,576 |
| Client CPU costs(ms) | | | |
| Query | 3.22 | 3.22 | 3.22 |
| Extract | 2.21 | 2.21 | 2.58 |
| Server CPU costs (sec) | | | |
| Setup | 0.42 | 1.68 | 7.41 |
| Expand | 0.064 | 0.13 | 0.28 |
| Answer | 0.21 | 0.79 | 3.33 |
| Network costs (KB) | | | |
| Query | 4 | 64 | 64 |
| Answer | 320 | 320 | 384 |

Another cost comparison between SealPIR and XPIR is understanding the costs affect end-to-end response time and overall throughput. To measure response time an experiment was conducted where a PIR server was deployed in a US West data center, and placed a PIR client under four deployment scenarios. The time to retrieve a 288-byte element using SealPIR, XPIR, and the sep secure copy command line tool were measured. The secure copy command represents a naive version of PIR in which a client downloads the entire database.

To measure throughput the PIR server was deployed in a US West data center, but accessed the PIR server with an increasing number of concurrent PIR clients deployed across the South India and EU West data centers. The goal was to ensure that the bottleneck was the server's CPU or the WAN network connection, and not the clients or some link between specific data centers. The number of requests serviced per minute at the server and the request completion times at the clients were measured.

One of the four deployment scenarios was an intra-DC, where the client and the server were both in the US West data center. The bandwidth between the two VMs was approximately 3.4 Gbps. This scenario was optimistic since the security of a PIR system makes the use of a PIR system inside two VMs in the same data center controlled by the same party is not useful. Nevertheless, this scenario gives an idea of the performance that PIR schemes could achieve if network bandwidth were plentiful.

Another deployment scenario was an inter-DC, where the client was placed in the South India data center. The bandwidth between the two VMs was approximately 100 Mbps. This scenario represented clients who deploy their applications in a data center (or well-provisioned proxy) that they trust, and access content from an untrusted data center.

Another deployment scenario was a home network, where the client was placed in the South India data center. However, the tc traffic control utility was used to configure the Linux kernel packet scheduler in both VMs to maintain a 20 Mbps bandwidth. This number was chosen as 20 Mbps is slightly over the mean download speed in the U.S. (18.7 Mbps). This scenario was optimistic to XPIR since this scenario ignores the asymmetry present in home networks where the uplink bandwidth is typically much lower.

The fourth deployment scenario was a mobile carrier, where the client was placed in the South India data center. The tc utility was used to configure VMs to maintain a 10 Mbps bandwidth. This number was chosen as 10 Mbs approximates the average data speed achieved by users across all U.S. carriers. As with the home network, this scenario was optimistic and ignores the discrepancy between download and upload speeds. This scenario aimed to represent the use of PIR from a mobile device, which is common deployment for applications such as private communication.

Figure 7:
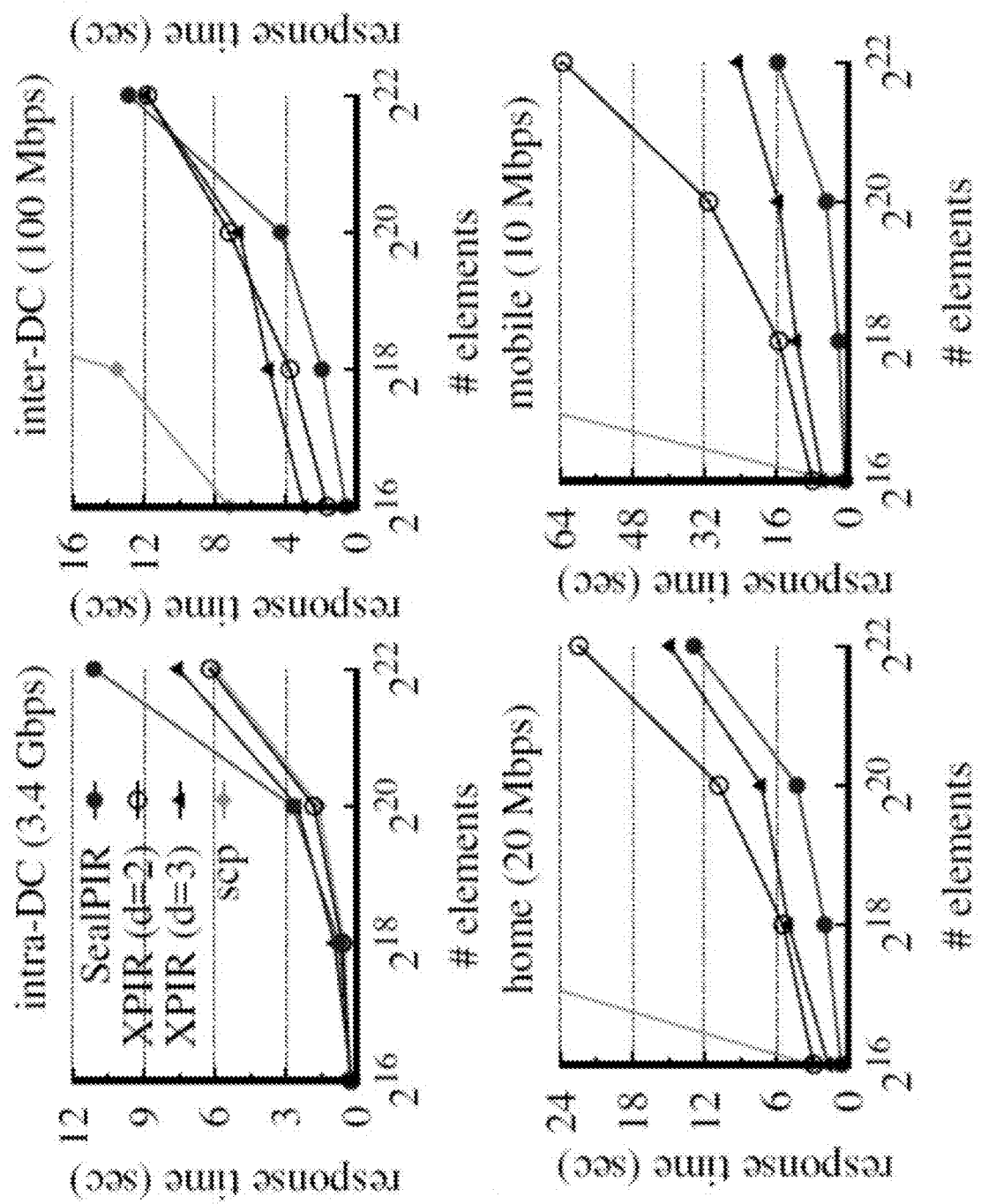
FIG. 7 shows response times of an experiment in accordance with respective examples.

FIG. 7 shows response times of an experiment over the four deployment scenarios in accordance with respective examples. At very high speeds, intra-DC, naive PIR (scp) was the best option, which was not surprising given the computational costs introduced by PIR. However, for all other network speeds, XPIR and SealPIR significantly outperformed downloading the entire database. As network bandwidth decreases, e.g., home, mobile, SealPIR's lower network consumption and competitive computational costs yielded up to a 42% reduction in response time.

Figure 8:
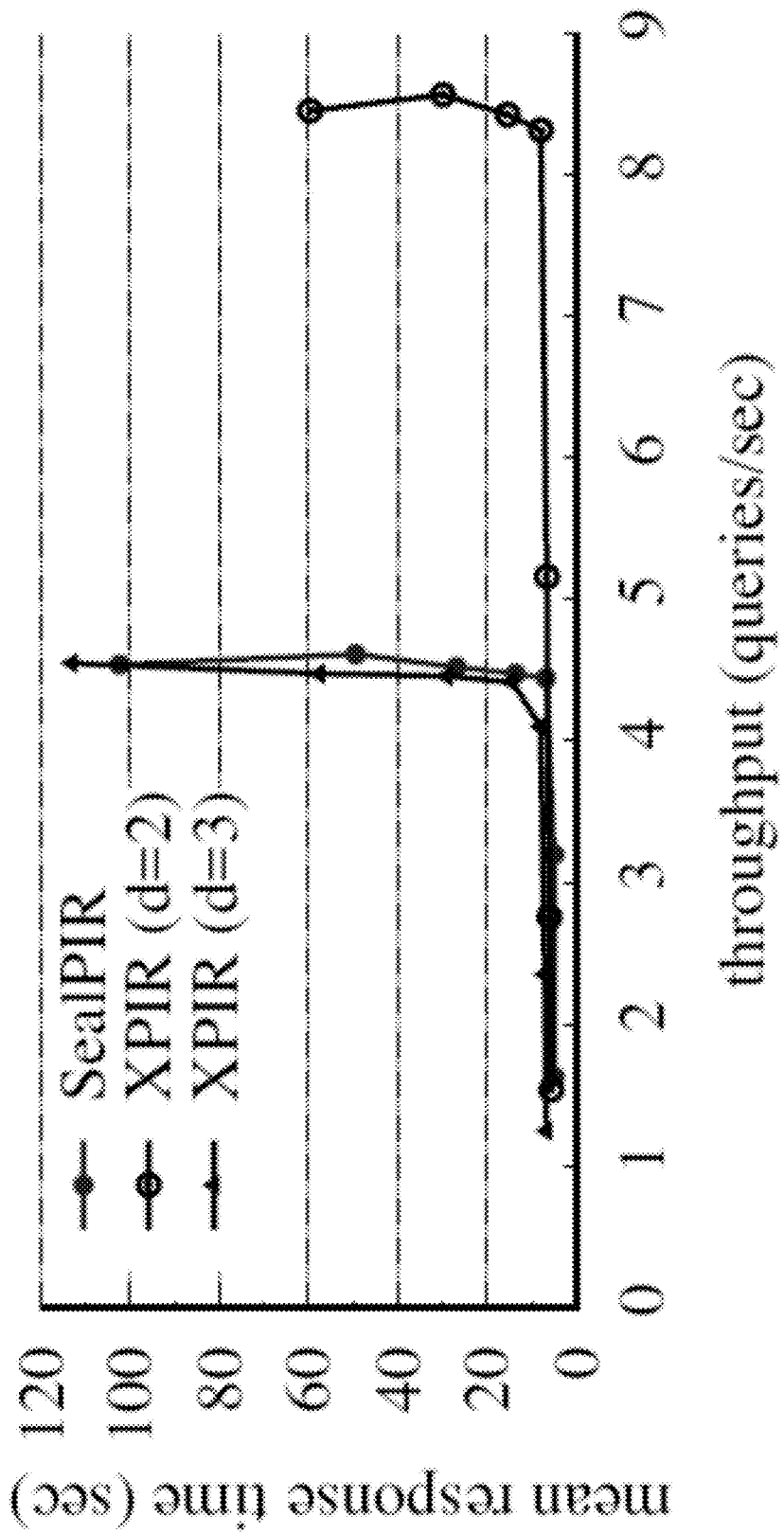
FIG. 8 shows throughput results of an experiment in accordance with respective examples.

FIG. 8 shows throughput results of an experiment in accordance with respective examples. The results in FIG. 8 depict the results of running from 4 to 256 clients each requesting one 288-byte element from a database with 220 entries. SealPIR achieved a similar throughput compared to XPIR with d=3, but a 47% lower throughput than XPIR with d=2. Most of the difference was not due to EXPAND, but rather due to an unoptimized code base. In this experiment, we found that the bottleneck is the CPU rather than the server's network. This suggests that trading off network resources to reduce CPU, as mPIR does, will lead improved throughput.

To understand how PBCs can improve throughput and what type of network overhead they add, the microbenchmark were repeated, but this time mPIR was used. To put the benefits and costs in context, the multi-query PIR scheme found in Pung was evaluated. Pung's protocol, like PBCs, was probabilistic and significantly improved over existing batch codes in terms of costs.

TABLES 7A-7B tabulate the results. The results show that mPIR did a better job than Pung's scheme at amortizing CPU costs across all batch sizes. This was a direct effect of the Cuckoo PBC producing fewer total codewords, see TABLE 4, since computational costs were proportional to the number of elements after encoding (m). At k=256 and 288-byte elements, mPIR achieved a 2.7× reduction in CPU cost for the server when answering queries over Pung's scheme. Over the naive approach of processing queries independently, the per-request CPU cost of mPIR was 50.3× lower. Repeating the experiment from FIG. 8 mPIR, with SealPIR as the underlying PIR scheme, and a batch of k=256 achieved a throughput of 197 queries/sec.

The difference in network costs was more pronounced. This was due to Pung's scheme which created a large number of buckets, see TABLE 4. To preserve privacy, clients issue a PIR query to each bucket. In terms of concrete savings, mPIR was more network efficient (upload and download) than Pung's scheme. Another advantage of mPIR is that mPIR had a lower failure probability, around $2^{40}$ compared to Pung's $2^{20}$

TABLE 7A

| | Single-Query | Pung's Multi-retrieval Batch size (k) | | |
|---|---|---|---|---|
| | 1 | 16 | 64 | 256 |
| Client CPU costs(ms) | | | | |
| MultiQuery | 3.19 | 28.77 | 28.56 | 28.20 |
| MultiExtract | 2.58 | 19.56 | 15.97 | 15.97 |
| Server CPU costs (sec) | | | | |
| MultiSetup | 7.41 | 2.18 | 0.68 | 0.30 |
| MultiAnswer | 3.62 | 1.31 | 0.47 | 0.19 |
| Network costs (KB) | | | | |
| Query | 64 | 577 | 577 | 577 |
| Answer | 384 | 2,885 | 2,308 | 2,308 |

TABLE 7B

| | mPIR (cuckoo hashing) | | |
|---|---|---|---|
| | Batch size (k) | | |
| | 1 | 16 | 64 |
| Client CPU costs(ms) | | | |
| MultiQuery | 4.85 | 4.33 | 4.17 |
| MultiExtract | 2.87 | 2.86 | 2.97 |
| Server CPU costs (sec) | | | |
| MultiSetup | 1.67 | 0.42 | 0.12 |
| MultiAnswer | 0.65 | 0.21 | 0.072 |
| Network costs (KB) | | | |
| Query | 84 | 84 | 83 |
| Answer | 420 | 420 | 333 |

In another experiment to get a sense of the end-to-end benefits that SealPIR and mPIR provide to actual applications, the available implementation of the Pung's unobservable communication system was modified. Pung is a messaging service that allows users to exchange messages in rounds without leaking any metadata, e.g., who they are talking to, how often, or when. Pung was chosen because Pung uses XPIR to achieve its privacy guarantees, and because Pung also relies on multi-query PIR to allow clients to receive multiple messages simultaneously. Consequently, Pung's PIR engine was switched from XPIR to SealPIR, and Pung's custom multi-query PIR scheme was replaced with mPIR.

In the modified-Pung messaging experiment, clients sent and retrieved k messages in a closed-loop, meaning that rounds were advanced as soon as all clients had sent and retrieved the messages, rather than waiting for a timeout. To experiment with many clients, 64 real clients accessed each server, and additional clients were simulated by pre-populating the servers' databases with random messages.

Figure 9:
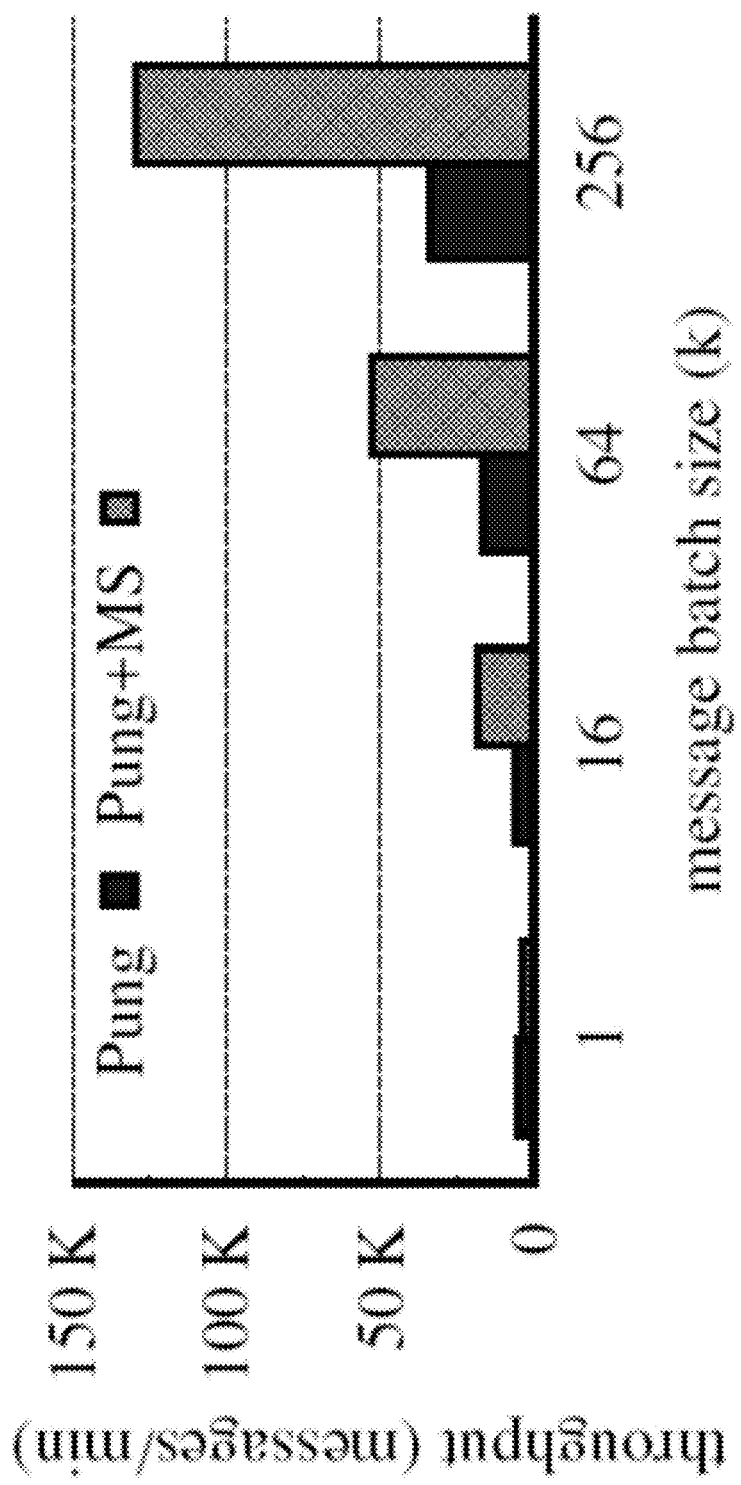
FIG. 9 shows throughput results of an experiment in accordance with respective examples.

FIG. 9 shows the throughput in messages per minute that Pung achieved with mPIR and SealPIR ("Pung+MS"). Pung+MS yielded better performance than the existing Pung code base for all batch sizes greater than 1. There are at least three reasons for this. First, Pung's multi-retrieval scheme produces 50% more codewords than mPIR, and therefore had to process over more elements. Second, Pung's multi-retrieval scheme produced 7× more buckets than mPIR. This forced Pung to run XPIR on many small databases that contained an average of 500 to 8,000 elements, depending on the batch size. Running XPIR on many small databases exacerbated XPIR's fixed costs. For example, running one instance of XPIR on a database of 100,000 elements is more efficient than two instances of XPIR on databases of 50,000 elements.

Last, even though SealPIR incurred additional CPU costs than XPIR (d=2) on large databases, SealPIR was faster when the database was small, see the columns with 65,536 elements in TABLE 6. Ultimately, due to these factors if clients send k=64 messages per round, Pung+MS processed 3.1× more messages per minute than Pung.

Figure 10:
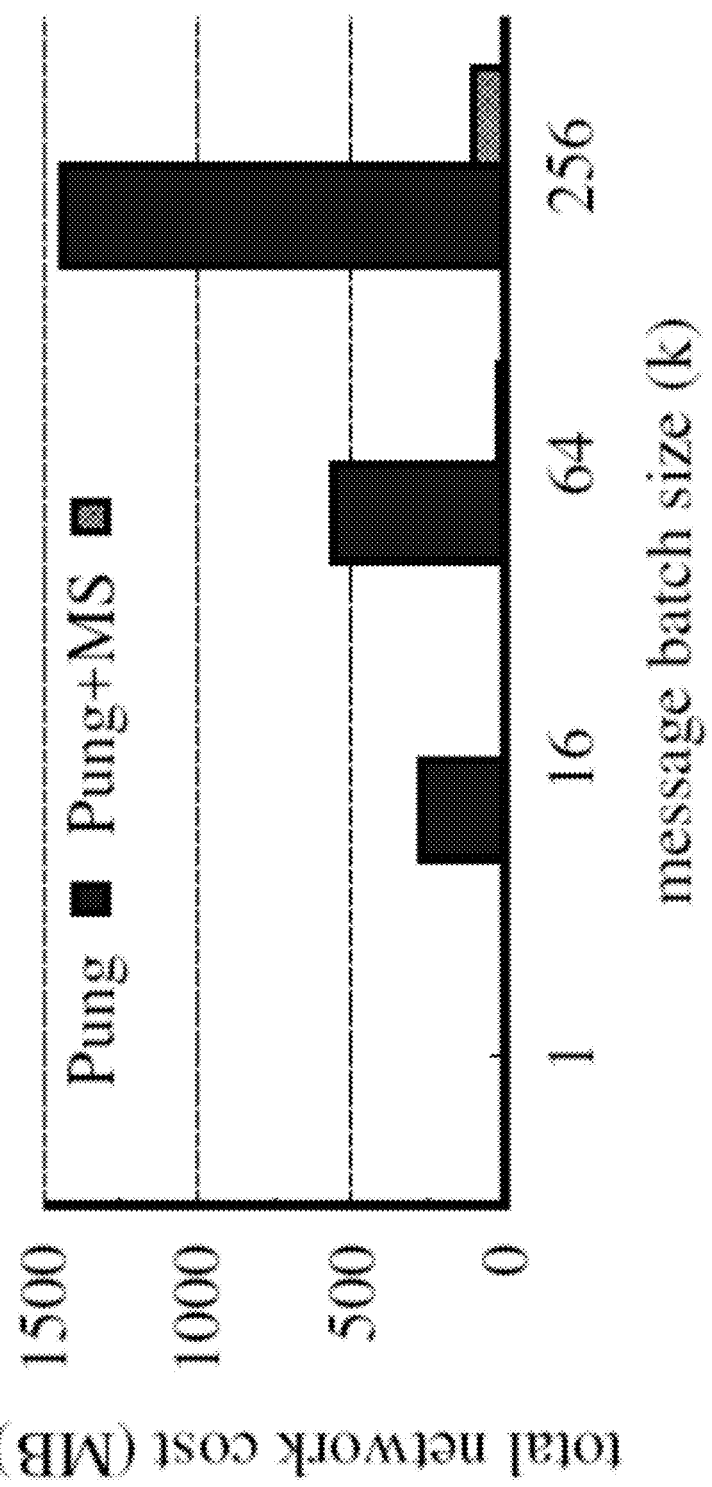
FIG. 10 shows network costs of an experiment in accordance with respective examples.

For network costs, the benefits of SealPR and mPIR are considerable. FIG. 10 depicts the total network cost incurred by a single client for one round of the Pung protocol. The compressed queries and fewer buckets resulted in savings of over 36×. The per-client communication costs were cut down to 7 MB per round for a batch size of 16 (versus 279 MB in the original Pung implementation). Thus, the SealPIR and mPIR implementation reduced network costs significantly across all batch sizes.

Figure 11:
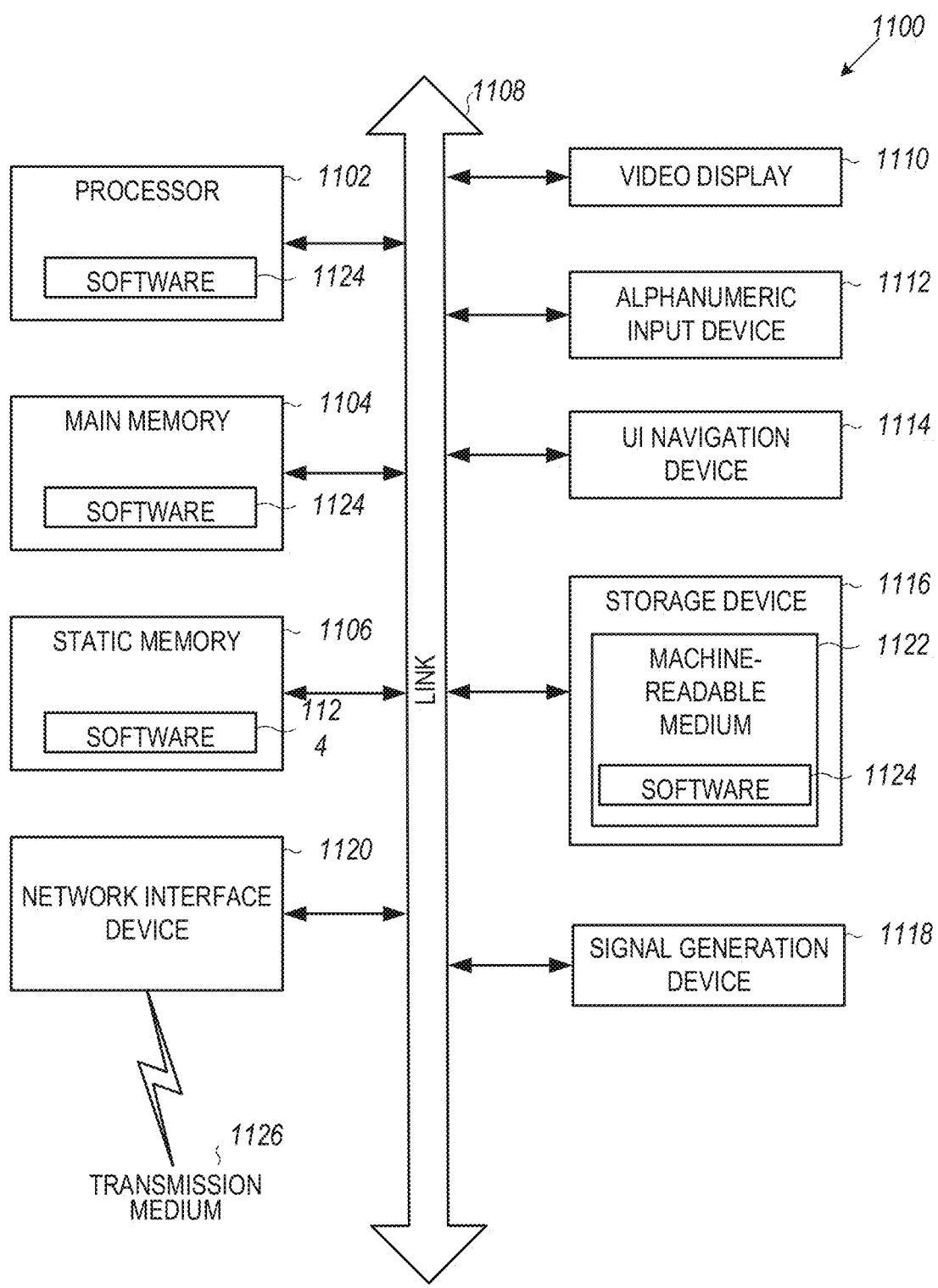
FIG. 11 is an example computing device that can be used in conjunction with the technologies described herein.

FIG. 11 is an example computing device that can be used in conjunction with the technologies described herein. In alternative embodiments, the computing device 1100 may operate as a standalone device or may be connected (e.g., networked) to other computing devices. In a networked deployment, the computing device 1100 may operate in the capacity of a server communication device, a client communication device, or both in server-client network environments. In an example, the computing device 1100 may act as a peer computing device in peer-to-peer (P2P) (or other distributed) network environment. The computing device 1100 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of the client 510, server 520, or buckets 530A, 530B, . . . , 530N, and perform the method of FIG. 6.

Computing device 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via a link (e.g., bus) 1108. The computing device 1100 may further include a display unit 1110, an input device 1111 (e.g., a keyboard), and a user interface (UI) navigation device 1114 (e.g., a mouse). In an example, the display unit 1110, input device 1112, and UI navigation device 1114 may be a touch screen display. In an example, the input device 1112 may include a touchscreen, a microphone, a camera (e.g., a panoramic or high-resolution camera), physical keyboard, trackball, or other input devices.

The computing device 1100 may additionally include a storage device (e.g., drive unit) 1116, a signal generation device 1118 (e.g., a speaker, a projection device, or any other type of information output device), a network interface device 1120, and one or more sensors 1121, such as a global positioning system (GPS) sensor, compass, accelerometer, motion detector, or other sensor. The computing device 1100 may include an input/output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1116 may include a computing-readable (or machine-readable) storage media 1122, on which is stored one or more sets of data structures or instructions 1124 (e.g., software) embodying or utilized by any one or more of the techniques or functions described herein. In an example, at least a portion of the software may include an operating system and/or one or more applications (or apps) implementing one or more of the functionalities described herein. The instructions 1124 may also reside, completely or at least partially, within the main memory 1104, within the static memory 1106, and/or within the hardware processor 1102 during execution thereof by the computing device 1100. In an example, one or any combination of the hardware processor 1102, the main memory 1104, the static memory 1106, or the storage device 1116 may constitute computing device (or machine) readable media.

While the computer-readable storage media 1122 is illustrated as a single medium, a "computer-readable storage media" or "machine-readable storage media" may include a single medium or multiple media (e.g., a centralized or distributed database, and/or associated caches and servers) configured to store the one or more instructions 1124.

In an example, a computer-readable storage media or machine-readable storage media may include any medium that is capable of storing, encoding, or carrying instructions for execution by the computing device 1100 and that cause the computing device 1100 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices, magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 1120 may use the transfer protocols to transmit data using transitory propagating signals.

In an example, the network interface device 1120 may include one or more physical jacks (e.g., Ethernet, coaxial, or phone jacks) or one or more antennas to connect to the communications network 1126. In an example, the network interface device 1120 may include one or more wireless modems, such as a Bluetooth modem, a Wi-Fi modem or one or more modems or transceivers operating under any of the communication standards mentioned herein. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. In an example, a transmission medium may include any intangible medium that is capable of storing, encoding or carrying instructions for execution by the computing device 1100, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method comprising operations performed using an electronic processor, the operations comprising:
receiving an encrypted vector including at least two indexes corresponding to an element of elements stored in an n-element database, wherein the n-element database is encoded into at least three buckets, wherein each element of the elements in the n-element database is stored within at least two of the at least three buckets, and wherein each bucket of the at least three buckets stores a proper subset of the n-elements;

determining, for each of the at least two indexes and based on values of the encrypted vector, a respective bucket to retrieve a first portion of the element at one of the at least two indexes and a second respective bucket to retrieve a second portion of the element at another of the at least two indexes;

querying the determined respective buckets to retrieve the element portions using a homomorphic search; and receiving the element portions from the at least two indexes based on the querying the determined respective buckets using the homomorphic search.

2. The method of claim 1, further comprising:
determining unqueried buckets; and
querying the unqueried buckets, wherein each of the at least three buckets is queried one time.

3. The method of claim 1, wherein the elements are allocated to buckets using cuckoo hashing.

4. The method of claim 1, wherein querying the determined respective buckets includes using a probabilistic batch code.

5. The method of claim 1, wherein the method further comprises simulating allocation for a first of the at least two indexes to determine the respective bucket, wherein the simulation indicates k-buckets, including the respective bucket, wherein each of the k-buckets stores the first portion of the element.

6. The method of claim 1, further comprising:
receiving at least two queries, wherein the queries comprise the at least two indexes, and wherein the at least two queries are ciphertexts; and
expanding the at least two queries into a plurality of ciphertexts.

7. The method of claim 6, further comprising concatenating the plurality of ciphertexts, wherein the concatenated plurality of ciphertexts is used to query the at least two indexes.

8. The method of claim 6, further comprising:
determining a column within the n-element database where the element is stored based on one of the at least two queries; and
determining a row within the n-element database where the element is stored based on a different one of the at least two queries, wherein the n-element database stores elements in a hypercube.

9. A system comprising:
a plurality of buckets, wherein each bucket stores elements and wherein each bucket stores a proper subset of n-elements;
a server configured to:
setup a n-element database, wherein each element of the elements in the n-element database is stored in at least two of the plurality of buckets;
receive an encrypted vector including at least two indexes corresponding to an element of elements stored in the n-element database;
determine, for each of the at least two indexes and based on values of the encrypted vector, a respective bucket to retrieve a first portion of the element at one of the at least two indexes and a second respective bucket to retrieve a second portion of the element at another of the at least two indexes;
query the determined respective buckets to retrieve the element portions using a homomorphic search;
receive the element portions from the at least two indexes based on the querying the determined respective buckets using the homomorphic search; and
return the elements.

10. The system of claim 9, wherein the server is further configured to receive at least two queries, wherein the queries comprise the at least two indexes, and wherein the at least two queries are ciphertexts; and
expand the at least two queries into a plurality of ciphertexts.

11. The system of claim 10, wherein the server is further configured to concatenate the plurality of ciphertexts, wherein the concatenated plurality of ciphertexts is used to query the at least two indexes.

12. The system of claim 10, wherein the server is further configured to:
determine a column within the n-element database where element is stored based on one of the at least two queries; and
determine a row within the n-element database where the element is stored based on a different one of the at least two queries, wherein the n-element database stores elements in a hypercube.

13. The system of claim 9, wherein the elements are allocated to buckets using cuckoo hashing.

14. The system of claim 9, wherein to query the determined respective buckets, the server is configured to use a probabilistic batch code.

15. A computer-readable storage media storing computer-executable instructions, the stored instructions comprising:
instructions to receive an encrypted vector including at least two indexes corresponding to an element of elements stored in an n-element database, wherein the n-element database is encoded into at least three buckets, wherein each element of the elements in the n-element database is stored within at least two of the at least three buckets, and wherein each bucket of the at least three buckets stores a proper subset of the n-elements;
instructions to determine, for each of the at least two indexes and based on values of the encrypted vector, a respective bucket to retrieve a first portion of the element at one of the at least two indexes and a second respective bucket to retrieve a second portion of the element at another of the at least two indexes:
instructions to query the determined respective buckets to retrieve the element portions using a homomorphic search; and
instructions to receive the element portions from the at least two indexes based on the querying the determined respective buckets using the homomorphic search.

16. The computer-readable storage media of claim 15, wherein the instructions further comprise:
instructions to determine unqueried buckets; and
instructions to query the unqueried buckets, wherein each bucket is queried one time.

17. The computer-readable storage media of claim 15, wherein the instructions further comprise:
instructions to receive at least two queries, wherein the queries comprise the at least two indexes, and wherein the at least two queries are ciphertexts; and
instructions to expand the at least two queries into a plurality of ciphertexts.

18. The computer-readable storage media of claim 15, wherein the instructions to further comprise instructions to simulate allocation for a first of the at least two indexes to determine the respective bucket, wherein the simulation indicated k-buckets, including the respective bucket, wherein each of the k-buckets stores the first portion of the element.

19. The computer-readable storage media of claim 15, wherein the elements are allocated to buckets using cuckoo hashing.

20. The computer-readable storage media of claim 15, wherein to query the determined respective buckets, the instructions further comprise using a probabilistic batch code.

* * * * *